(12) United States Patent
Lange

(10) Patent No.: US 12,271,922 B2
(45) Date of Patent: *Apr. 8, 2025

(54) SYSTEMS AND METHODS FOR FINANCIAL DATA COMMUNICATIONS AND DATA MANAGEMENT

(71) Applicant: DLIC HOLDINGS, LLC, Zionsville, IN (US)

(72) Inventor: Jeffrey S. Lange, Chicago, IL (US)

(73) Assignee: DLIC HOLDINGS, LLC, Zionsville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,303

(22) Filed: Sep. 18, 2023

(65) Prior Publication Data

US 2024/0070706 A1 Feb. 29, 2024

Related U.S. Application Data

(63) Continuation of application No. 14/463,659, filed on Aug. 20, 2014, now Pat. No. 11,763,333.

(Continued)

(51) Int. Cl.
G06Q 30/0207 (2023.01)

(52) U.S. Cl.
CPC .............................. *G06Q 30/0224* (2013.01)

(58) Field of Classification Search
CPC .... G06Q 30/06; G06Q 20/20; G06Q 30/0601; G06Q 20/12; G06Q 20/322;
(Continued)

(56) References Cited

U.S. PATENT DOCUMENTS 7,107,225 B1 9/2006 McClung, III
8,925,802 B1 1/2015 Pletz et al.
(Continued)

FOREIGN PATENT DOCUMENTS

| WO | 0150305 | 7/2001 |
| WO | 01063520 | 8/2001 |
| WO | 2013066982 | 5/2013 |

OTHER PUBLICATIONS

A. A. El Masri and J. P. Sousa, "Limiting Private Data Exposure in Online Transactions: A User-Based Online Privacy Assurance Model," 2009 International Conference on Computational Science and Engineering, Vancouver, BC, Canada, 2009, pp. 438-443, doi: 10.1109/CSE.2009.433. (Year: 2009).

(Continued)

*Primary Examiner* — Elda G Milef
(74) *Attorney, Agent, or Firm* — Fox Rothschild LLP

(57) ABSTRACT

The principles and embodiments of the present invention relate to a system for facilitating an interaction between a person (group or sponsor) and a merchant. In some embodiments, a system is provided in which the person electronically institutes a promise to spend a specific amount of money on purchases with the particular merchant in a specific time period and the merchant electronically institutes a savings offer on transactions made using a credit or debit card in exchange for the customer setting aside the predetermined amount of money. The system can comprise an account management system, user interface, first communication system, merchant interface system, second communication system and payment processor that may be dispersed elements or nodes interconnected by communication lines.

15 Claims, 24 Drawing Sheets

Related U.S. Application Data

(60) Provisional application No. 61/868,041, filed on Aug. 20, 2013.

(58) Field of Classification Search
CPC ............ G06Q 20/401; G06Q 30/0641; G06Q 20/405; G06Q 20/387; G06Q 30/0222; G06Q 30/0238; G06Q 20/00
See application file for complete search history.

(56) References Cited

U.S. PATENT DOCUMENTS

| | | |
|---|---|---|
| 10,380,605 B2 | 8/2019 | Groff et al. |
| 2007/0026591 A1 | 2/2007 | Grupp et al. |
| 2009/0234771 A1 | 9/2009 | Ledbetter et al. |
| 2010/0013834 A1 | 1/2010 | Schmidt et al. |
| 2012/0000496 A1 | 1/2012 | Razon |
| 2012/0004968 A1 | 1/2012 | Satyavolu et al. |
| 2012/0024599 A1 | 2/2012 | Yamashita et al. |
| 2012/0245990 A1 | 9/2012 | Agarwal |
| 2013/0007336 A1 | 1/2013 | Chun et al. |
| 2013/0017924 A1 | 1/2013 | Shimizu et al. |
| 2013/0028246 A1 | 1/2013 | Gonikberg |
| 2013/0073366 A1 | 3/2013 | Heath |
| 2013/0110604 A1 | 5/2013 | Rooke et al. |
| 2013/0179242 A1 | 7/2013 | Kaplan |
| 2013/0185192 A1 | 7/2013 | McGuire |
| 2014/0012943 A1 | 1/2014 | Yang et al. |
| 2014/0021466 A1 | 1/2014 | Yamazaki et al. |

OTHER PUBLICATIONS

International Search Report and Written Opinion, PCT/US14151767, mailed Nov. 18, 2014.

SYSTEMS AND METHODS FOR FINANCIAL DATA COMMUNICATIONS AND DATA MANAGEMENT

CROSS REFERENCE TO RELATED APPLICATIONS

This application is a continuation of U.S. patent application Ser. No. 14/463,659, filed Aug. 20, 2014 which claims the benefit of provisional application 61/868,041 filed Aug. 20, 2013, the entire contents of which are expressly incorporated herein by reference thereto.

BACKGROUND OF THE INVENTION

Field of the Invention

The subject disclosure relates to methods and systems for creating, offering, and administering financial accounts that provide discounts and/or rewards.

Background of the Related Art

Existing systems provide various opportunities for consumers and merchants to interact and implement relationships through direct or indirect data, social, financial, or reward programs. Existing systems include many deficiencies, such as inefficiencies in overhead and processes that inhibit effective establishment of relationships and improved transaction benefits. Consumers, for example, are generally trapped without the ability to communicate financial capability or interest to merchants, and merchants have limited channels for increasing transactions with consumers, and such channels create procedural and financial costs. Existing systems involving banks, investments, merchants, online sales, payment processes and other existing systems are also deficient in not including tools that consumers and merchants can interact with for carrying out new forms of financial relationships between consumers and merchants. Better systems and methods that efficiently integrate consumer and merchant interactions and that can be integrated into technology that manages consumer financial data are also desired.

SUMMARY OF THE INVENTION

In accordance with one embodiment of the present invention, a system for performing data transactions s provided. Data transactions can be performed over a dispersed network of elements (e.g., where the system comprises the dispersed network of elements or interacts with dispersed elements). The system can include an account management system, including a first database that stores records of user accounts containing financial data of individual users and also stores individual personal data representative of personal characteristics of the respective users and manages individual financial states of financial accounts in response to transaction requests that add to or draw from the financial accounts. The account management system further modifies the financial data over time and processes the financial data to generate a value representative of a current value, implements individual credit or debit card accounts with corresponding credit or debit cards that are personal to at least a subset of the users, generates and maintains a record of account transactions using the credit or debit accounts, for each credit or debit card account, specifies a first data value and manages transactions using the first data value as a limit on transaction processing, and implements a process that links the first data value to a credit or debit card.

The system also includes a user interface system including a first communications interface that is coupled to the account management system and based on information from the account management system, provides the users with the credit or debit card accounts the opportunity to select to participate in a service, such that the user interface system interacts with user devices to generate a user interface for the users that includes interactive options that provides individual users with the option to manipulate data stored by the user interface system, including allowing individual users to designate at least two planned data characteristics comprising at least a first financial value and associated budget type. The user interface system is configured to communicate with the account management system.

Additionally, the system includes a merchant interface system including a second communications interface that is coupled to the user interface system. The merchant interface system interacts with merchant devices to generate a merchant interface that generates interactive options that provide individual merchant users the opportunity to enter an offer message comprising a set of data characteristics representative of an offer for a financial arrangement with the merchant, and transmits the offer message to at least a subset of users in response to those users' specified budget type, such that the merchant interface permits the merchant users to transmit offer messages to users of the account management system.

The user interface system permits the users to select and accept one or more of the offer messages, and in response, the account management system attaches a restriction characteristic to the financial data in the account management system. The account management system subsequently receives data generated from transactions by individual users that accepted a particular offer message and used their credit or debit card for the transactions, and in response, modifies and maintains the first data value by applying data representative of the accepted offer message to the credit or debit card account in response to the transaction being sent to a payment processor and the transaction data containing a merchant identifier for a corresponding accepted offer message.

In accordance with yet another embodiment of the present invention, the account management system is configured to track usage of accepted offers by users and in response, remove the restriction characteristic from a particular user's financial data when available usage under an accepted offer is completed.

In accordance with another embodiment of the present invention, the account management system is configured to track usage of accepted offers by users and in response, apply a fee to a user's financial data when a particular accepted offer is not completed by a corresponding user.

In accordance with yet another embodiment of the present invention, the account management system is configured to be a provider of checking or investment accounts to users. The account management system is configured to apply payments to external companies to the financial data of individual users.

In accordance with another embodiment of the present invention, the user interface system is configured to provide users with one or more options to designate financial information based on the financial data from the account management system and permit the designated financial information to be made available to merchants.

In accordance with yet another embodiment of the present invention, the system is configured to provide a service that merchants and users select to join and through which users with accounts on the account management system participate and merchants transmit offers to users.

In accordance with another embodiment of the present invention, a system for performing data transactions over dispersed network elements is provided. The system includes an account management system, including a first database that stores records of user accounts containing financial data of individual users and also stores individual personal data representative of personal characteristics of the respective users. The account management system modifies the financial data for each user by applying investment characteristics that vary the value for the financial data over time and processes the financial data to generate a value representative of a current investment value, implements individual credit or debit card accounts with corresponding credit or debit cards that are personal to at least a subset of the users, generates and maintains a record of account transactions using the credit or debit accounts, for each credit or debit card account, specifies a first data value and manages transactions using the first data value as a limit on transaction processing, and implements a process that links the first data value to a credit or debit card.

The system also includes a user interface system including a first communications interface that is coupled to the account management system. The user interface system interacts with user devices to generate a user interface for the users that includes interactive options that provides individual users with the option to manipulate data stored by the user interface system, including allowing individual users to designate at least two planned data characteristics comprising at least a first financial value and associated budget type. The user interface system is configured to communicate with the account management system and in response, provide users with the opportunity to selectively designate financial information from the account management system for that individual user based on the financial data.

The system also includes a merchant interface system. The merchant interface system includes a second communications interface that is coupled to the user interface system. The merchant interface system interacts with merchant devices to generate a merchant interface that generates interactive options that provide individual merchant users the opportunity to enter an offer message comprising a set of data characteristics including a discount percentage value, a duration value during which the discount percentage value is valid for all transactions using the debit or credit card with the merchant, and transmits the offer message to a subset of users in response to that user's specified budget type, whereby the merchant interface permits the merchant users to make discount offers to users in exchange for restricting at least a portion of the financial data to discount offers.

The user interface system permits the users to select and accept one or more of the offer messages, and in response, the account management system attaches a restriction characteristic to the financial data in the account management system that links the portion of the financial data corresponding to the designated first financial value of that user to the user's credit or debit card account. The account management system subsequently receives data generated from transactions by individual users that accepted a particular offer message and used their credit or debit card for the transactions, and in response, modifies and maintains the first data value using the corresponding discount percentage value in response to the transaction being sent to a payment processor and containing a merchant identifier for a corresponding accepted offer message.

In accordance with yet another embodiment of the present invention, the system for performing data transactions further includes a rewards system that is configured to generate and manage rewards generated from user transactions. The rewards are stored for individual accounts in addition to a monetary value of the accounts.

In accordance with another embodiment of the present invention, the system for performing data transactions further includes making at least a portion of one or more users' profile information and data characteristics, including at least the first financial value and the associated budget type, available to the merchant interface system.

In accordance with yet another embodiment of the present invention, each of one or more individual merchant users provides at least a discount percentage value and a duration during which the discount percentage value is valid as the offer message, and the user receives the one or more offer messages from merchant interface systems at the user interface system.

In accordance with another embodiment of the present invention, the individual merchant users engage in a reverse auction, where each individual merchant interface system receives the other merchant offer messages, and compete, by offering a higher discount percentage or a more attractive offer, for the user's first value.

In accordance with yet another embodiment of the present invention, the system for performing data transactions further includes a communications system, and the account management system, the user interface system, and the merchant interface system are dispersed systems that are interconnected and in communication with each other through the communication system.

In accordance with another embodiment of the present invention, the account management system, the user interface system, and the merchant system are implemented on a computer or a group of computers.

In accordance with yet another embodiment of the present invention, the system for performing data transactions implements merchant communications features that communicate with merchants and generate one or more request messages that contain information based on received transaction activity of users and data characterizing accepted offers, transmits the request messages to respective merchants, and receives communications from merchants transmitting electronic data representing funds in response to one or more requested messages.

In accordance with another embodiment of the present invention, the account management system manages the electronic data and generates information for use by users that provides a current customer account value after accepted and used discounts have been applied.

In accordance with yet another embodiment of the present invention, a system that manages one or more financial accounts of users including applying transaction data to the financial accounts over time and maintaining security of accounts is provided. The system includes a computer system that is secured within a network of one or more account management systems that manage the financial accounts. The computer system is configured to manage and apply merchant offers to user financial accounts in cooperative relationship management of the account management system. The computer system is also configured to receive and store a database of merchant offers that have been accepted by corresponding users, to receive transaction data from merchant transactions into the account management system, to compare transaction data to accepted offers and automatically apply accepted offers from the database based on merchant identifiers and based on whether a personal transaction card linked to corresponding users' financial accounts was used to pay the associated merchant, and in response, adjust account values up or down for corresponding users so as to signify a change in account value in accordance with data characteristics of accepted offers.

In accordance with another embodiment of the present invention, the computer system is implemented as part of the account management system.

In accordance with yet another embodiment of the present invention, the network is a secure financial network that receives transaction data as part of processing and paying for user transactions.

In accordance with another embodiment of the present invention, the system that manages one or more financial accounts comprises an electronic communication channel that is configured to provide an interface that permits users and merchants to exchange information including providing users the opportunity to communicate personal information about financial commitment to future spending and providing merchants with the opportunity to communicate offers in response to receiving the personal information.

In accordance with yet another embodiment of the present invention, the computer system is configured to track usage of offers under accepted offers.

In accordance with another embodiment of the present invention, the computer system is configured to receive electronic communications providing financial payments from merchants that correspond to accepted offers.

In accordance with yet another embodiment of the present invention, the computer system is configured to apply a fee to a particular financial account and issue a corresponding payment to a merchant when an associated user did not use an accepted offer.

The principles and embodiments of the invention relate to a computer system for performing data transactions over dispersed network elements, comprising an account management system, comprising a first database that stores records containing financial data of individual users and also stores individual personal data representative of personal characteristics of the respective users, wherein the account management system modifies the financial data for each user by applying investment characteristics that vary the values for the financial data over time and processes the financial data to generate a value representative of a current investment value. The account management system, in response to user interaction, may generate and maintain a record, specify a first data value as a function of the financial data, and manage transactions using the first data value as a limit on processing, and implements a process that links the first data value to a credit or debit card that is personal to the user.

Embodiments of the invention further comprise a user interface system, comprising a communications interface that is coupled to the account management system, wherein the user interface generates a user interface for the users that includes an interactive feature that provides individual users with the option to manipulate data stored by the user interface system, including allowing individual users to designate at least two planned data characteristics comprising at least a first financial value and associated budget type; wherein the user interface system is configured to communicate with the account management system and restrict individual users in designating information specifying at least one of the transaction characteristics as a function of the financial data at the account management system for that individual user.

Embodiments of the invention further comprise a merchant interface system comprising a second communications interface that is coupled to the user interface system, wherein the merchant interface system generates a merchant interface that permits individual merchant users to receive at least a portion of the user designated characteristics and associated values entered by the users, generates interactive options that provide individual merchant users the opportunity to enter an offer message comprising a set of data characteristics including a savings or discount percentage value, a duration during which the savings or discount percentage value is valid for all transactions using the debit or credit card with the merchant user, and transmits the offer message to a subset of users in response to that user's specified budget type, whereby the merchant interface permits the merchant users to make savings or discount offers to users in exchange for restricting an amount or account characteristic to transaction processing involving an identifier of that merchant user, wherein the user interface system permits the users to select and accept one or more of the offer messages, and in response, the account management system attaches a restriction characteristic to the amount or account characteristic, and further wherein the account management system subsequently receives data generated from transactions by individual users that accepted a particular offer message and used their credit or debit card for the transactions, and in response, modifies and maintains a first data value using the corresponding savings or discount percentage value in response to the transaction being sent to a payment processor.

The principles and embodiments of the invention relate to a system in which the individual user may earn a reward for transactions using the debit or credit card.

The principles and embodiments of the invention relate to a system wherein a reward may be received as a form of value upon spending by customers from the users' use of their credit or debit cards that provide additional spending resources to the individual user.

The principles and embodiments of the invention relate to a system wherein the user can select from different rewards that provide different benefits to the user for transactions using the debit or credit card.

The principles and embodiments of the invention relate to a system wherein records containing financial data of individual users may be investment accounts, and the first data value is an amount available to the individual user recorded in a spending account, where the value in the spending account may be linked to the credit or debit card, and the account management system modifies the spending account value in response to transactions using the user's credit or debit card. The spending account may be increased as a form of reward when the user engages in transactions with the debit or credit card, and a maximum amount of reward may be based upon the value of the investment account. For example, the system may be configured to be able to provide a maximum amount of reward benefits over a time period. The maximum can be based on the current account value of the financial account and a predetermined value attribution rate that is paid in cash-back or other rewards to the spending account. The available reward amount can, for example, correlate to the user being eligible to receive X percentage of the total monetary value of credit card transactions up to a maximum total Y monetary value of transactions as spending potential or redeemable points on the credit card to the user during a particular financial period.

The account management system may be configured to receive data generated from transactions by individual users, determine whether the value in the spending account is sufficient to cover an entire amount of the transaction, and if the value in the spending account is sufficient, calculates an amount to be deducted from the spending account.

The investment accounts may have investment account characteristics including at least an interest rate that the account management system uses to modify the financial data recorded in the investment account, and the spending account has data characteristics including at least a money amount and a budget type. A budget type may identify at least a category of products or services for which the money amount can be utilized for transactions using the credit or debit card.

Embodiments of the invention may further comprise making at least a portion of one or more users' profile information and data characteristics comprising at least the first financial value and the associated budget type available to the merchant interface system. The users' profile information made available to the merchant interface system may include one or more of an account identification number, a user's zip code, a user's income level, a user's age, a user's familial role, a budget type, and/or preferred categories of products. The one or more identifying criteria may be selected from available values of user profile information by an individual merchant user and communicated to the account management system; the individual data characteristics stored within the first database may be sorted by using the one or more identifying criteria to form a pool of user data; and the account management system can communicate the pool of sorted personal data to the merchant interface system. The pool of sorted personal data may be an aggregated pool of data relating to a sub-portion of users, where the sub-portion of users have at least one common characteristic data value, and the pool of sorted personal data eliminates individual identifying data to protect user privacy.

Embodiments of the invention may further comprise a sorting system in communication with the account management system and first database that receives the identifying criteria and performs the sorting of personal data.

Embodiments of the invention may further comprise an auction engine, wherein each of one or more individual merchant users provides at least a savings or discount percentage value and a duration during which the savings or discount percentage value is valid as the offer message, and the user receives the one or more offer messages from merchant interface systems at the user interface system. The individual merchant users can engage in a reverse auction, where each individual merchant interface system receives the other merchant offer messages, and compete for the user's first value.

Embodiments of the invention may further comprise a communications system, wherein the account management system, the user interface system, and the merchant interface system are dispersed systems that are interconnected and in communication with each other through the communication system.

The principles and embodiments of the invention also relate to a system for performing data transactions over dispersed network elements, comprising an account management system, a user interface system, and a merchant interface system.

The principles and embodiments of the invention also relate to a computer system that manages data relationships among multiple entities. The computer system may comprise a first computer platform comprising a user interface configured to have an entry field for customer(s) to indicate a designated amount assigned to a dedicated spending account and designate an objective qualifier from a plurality of objective qualifiers that restricts the corresponding dedicated spending account, a non-transient computer memory configured to have a database for storing a plurality of investment accounts and corresponding dedicated spending accounts, wherein each investment account and spending account is stored in an electronic data record associated with a particular customer, a processor that generates an identification code to be assigned to the customer's dedicated spending account, associates a corresponding debit card with the identification code and spending account, and applies transaction data generated by the debit card at point-of-sale systems to the customer's dedicated spending account. The identification code may have a unique value that distinguishes the specific user, credit card, and account from other users, credit cards, and accounts.

The computer system may also comprises communications hardware configured to transmit at least the value of the dedicated spending account to another computer platform, a second computer platform that is provided to a plurality of merchant users, wherein the second computer platform may be hardware, software, firmware, or any combination thereof, comprising a non-transient computer memory configured to have a database for storing at least the one or more transmitted spending account values in one or more electronic data records, a processor configured to identify a savings or discount multiplier to be associated with stored spending accounts associated with a group of customers having a common objective qualifier and further configured to identify an associated time period during which the savings or discount multiplier will be applied for each one of a plurality of point-of-sale transactions with the merchant user, wherein the platform includes an interface that interacts with merchant users and allows individual merchant users to designate and store a particular savings or discount multiplier and associated time period available from that merchant user, and communication hardware configured to receive one or more dedicated spending account value(s) and transmit at least the particular savings or discount multiplier values to the first computer platform.

The first computer platform may display the received savings or discount multiplier value(s) from the one or more second computer platform(s) to the customer for selection, where the first computer platform is configured to transmit the customer's selection to the appropriate second computer platform to authorize and enable the spending account to benefit from the savings or discount multiplier during the associated time period in response to the customer's use of their corresponding credit card in point of sale-transactions with that merchant based on the customer's selection.

The savings or discount percentage value may be implemented by the computer system to reduce transaction amount(s) received by the account management system during the duration in which the savings or discount percentage value is valid to reward the credit card user for use of their credit or debit card; and the account management system records the monetary value of transactions conducted during a period of time and increases the first financial value by the savings or discount percentage value by the end of the period.

The one or more identifying criteria can be selected by an individual merchant user and communicated to the account management system, the individual personal data stored within the first database may be sorted by using the one or more identifying criteria to form a pool of user data, and the account management system communicates the pool of user data to the merchant interface system.

The user may receive one or more offer messages from merchant interface systems at the user interface system, the best received data characteristics may be communicated to all the merchant interface systems that previously provided an offer message, each individual merchant user determines whether to communicate a subsequent offer message comprising a better set of data characteristics to the user interface, communication of the best received data characteristics to the merchant interface systems that provided subsequent offer messages to the user, and the communication is repeated until none of the individual merchant users communicate a better set of data characteristics to the user interface for the user to select and accept one or more of the offer messages.

The principles and embodiments of the invention also relate to a computer system configured to administer and manage financial products that generate value in the form of benefit rewards received from the use of credit cards. Transaction information may be received from one or more remote computer systems, where the information may comprise credit or debit card transaction information that is received in response to the use of the card by customers when the customers spend available spending account value on their corresponding cards. The system can process the received transaction information and one or more characteristics underlying the stored financial accounts and in response generate one or more outputs representing current reward benefits that presently accrue to the customers. The reward benefits may provide additional spending resources to the customers, wherein the processing comprises generating the amount of reward benefits as a form of value received upon spending by customers from the customers' use of their credit cards. Processing by the computer system is performed to calculate an amount of reward benefits to give to the customer. The amount of reward benefits is, for example, determined to be an eligible percentage of the monetary value of credit card transaction activity generated by the card owner. If desired, the total amount of rewards generated within a particular time period can be limited to a percentage of the amount in the financial account.

According to the novel facility for users, value is generated in the form of savings or discounts and/or benefit rewards received from the use of credit cards, where credit cards comprise a conventional credit card or debit card, software, and data on a smartphone, flashdrive, or a cloud service that is connected to a credit card or debit card account, and other forms of portable financial account devices that may carry a non-transitory memory for storing financial and identification information. For the sake of brevity, it should be understood that a reference to credit cards is also applicable to debit cards unless otherwise distinguished, and vice versa.

The financial institution administering the card and/or financial account can receive the related transaction information from a payment processing service (e.g., PayPal™) that received a payment request for a transaction or can receive the related transaction information through direct (e.g., through network communications with the vendor) or indirect means (e.g., through an intermediary that first receives the information).

The subject technology would preferably utilize, if not be fully executed by, modern computing technology. The computer technology is user-interactive and may be self-contained so that users need not leave or venture to another address within a distributed computing network to access various information. The following discussion describes the structure of such an environment, like the Internet or many common intranets, but further discussion of the methodology of one or more embodiments of the present invention is described elsewhere herein.

The computing environment includes one or more servers which communicate with a distributed computer network via communication channels, whether wired or wireless, as is well-known to those of ordinary skill in the pertinent art. The system can host multiple Web sites and houses multiple databases necessary for the proper operation of the subject technology.

It should be appreciated that the subject technology can be implemented and utilized in numerous ways, including without limitation as a process, an apparatus, a system, a device, a method for applications now known and later developed, or a computer-readable medium. These and other unique features of the system disclosed herein will become more readily apparent from the following description and the accompanying drawings. The system is also applicable to other types of accounts which store value and credit interest or provide investment returns.

BRIEF DESCRIPTION OF THE DRAWINGS

Further features of this invention, its nature, and various advantages will become more apparent upon consideration of the following detailed description, taken in conjunction with the accompanying drawings, in which like reference characters refer to like parts throughout, and in which.

DETAILED DESCRIPTION OF THE INVENTION

Figure 1A:
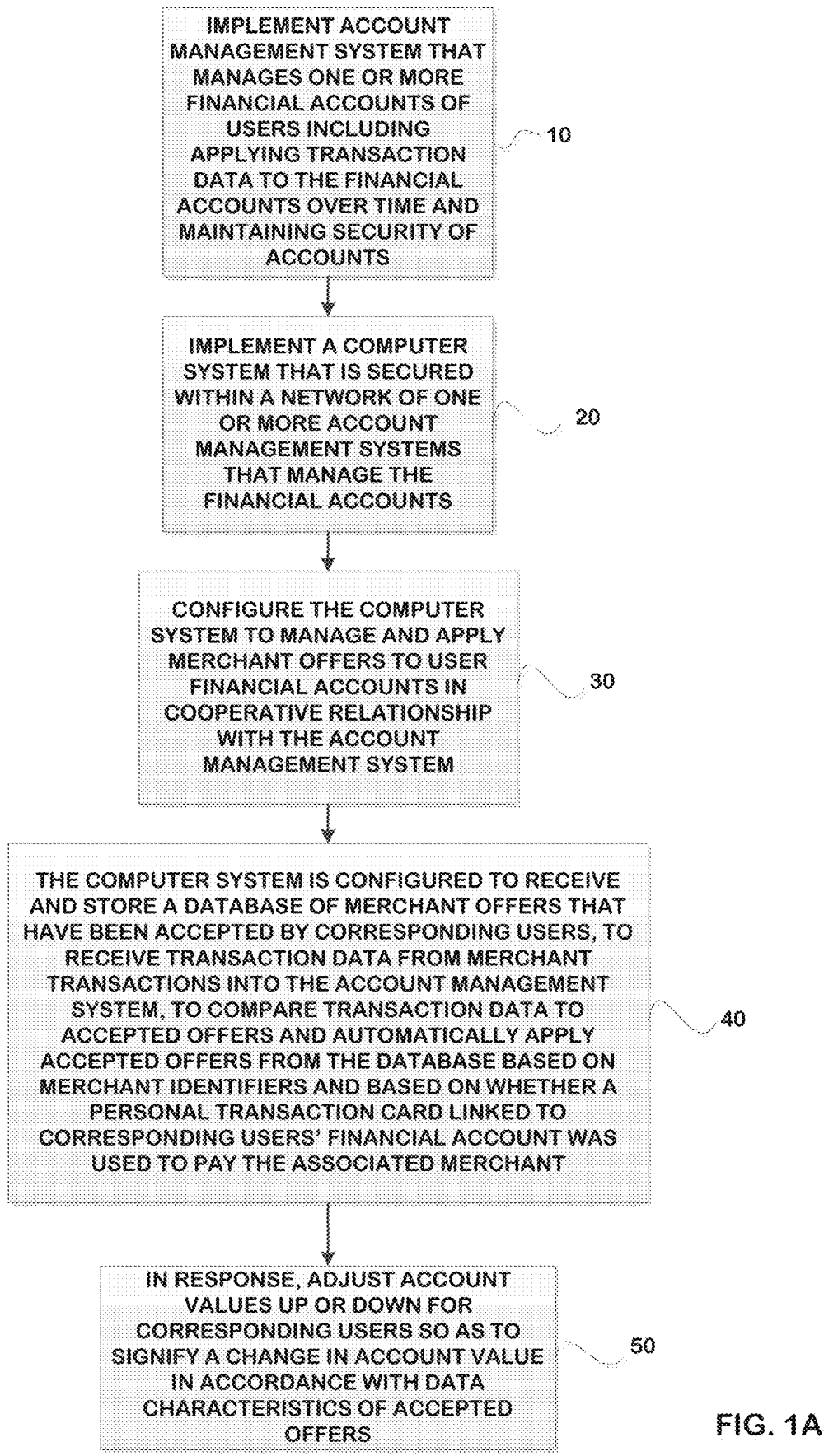
FIG. 1A illustrates an embodiment of the components and processes of the system for performing data transactions involving the account management system implemented as part of a secure financial network.

The principles and embodiments of the present invention relate to a system for implementing an electronic network and electronic interactions as features that advance consumer activities, such that relationships can be electronically implemented, tracked, and enforced. Consumers and merchants can network via an exchange of information. Restrictions can be attached to account operations of consumers. The restriction can be specified and attached to consumer communications identifying a desired future activity. The restriction can be unattached when a consumer and merchant complete a mutually-designated interaction (e.g., purchasing from the merchant until a threshold dollar amount is reached, purchasing a specific item, etc.). For example, in operation, a consumer can issue an electronic notice or message that designates a specific amount of money on purchases in a particular budget category, and merchants can use the system to issue an electronic message or notice to selected consumers, specifying a savings or discount percentage that is usable within a specific time period for goods or services sold by the merchant. The system can track, update, and enforce the restrictions.

The principles and embodiments of the present invention can also relate to a system that provides individuals wishing to obtain discounts or savings from a select group of merchants the opportunity to pledge a portion of funds held in a financial account (or pledge a form of financial restriction demonstrating a corresponding commitment level) for making purchases with the selected merchants. The system may also provide merchants an opportunity to make offers to potential customers, in which the merchant guarantees a certain savings offer, savings plan, or savings or discount percentage on all transactions made using a specified credit or debit card in exchange for the customer setting aside a predetermined minimum amount of funds in an account associated with the specified credit or debit card. Setting aside a predetermined minimum amount of funds in the account can be one illustrative embodiment. Other restrictions such as designating a financial resource to be collateral can be used to as a feature of the system.

Various technology related factors can be implemented to provide advanced transaction systems. Users that have financial accounts can self-designate information describing their personal financial information. The information can include expected levels for various spending budget items. Merchants preferably can receive the self-designated information or representative data and generate and transmit savings or discounts offers to individual users or to groups of users. The exchange of information can be in a communication platform or channel established to facilitate the interaction and implementing resulting electronic relationships. Users can accept individual saving or discounts offers as part of the system. Also, as part of the process, such as, during the self-designation process by users, a financial level of commitment of individual users can be linked to the self-designated information. The financial level of commitment can specify a financial consequence or resource that can be applied to the user's financial resources (e.g., a restriction characteristic that is specified and stored in the system for later use in case of deficiencies). For example, the system can link an asset of the user to the self-designated information. The asset can be used to pay for transactions or the asset can be a resource that is used if the user does not otherwise use an accepted savings or discount offer. The level of financial commitment can be communicated to the merchants (e.g., so as to factor into generating the attractiveness of their offer). The process can be integrated into the financial account systems of users. Such a system can have the authority and can preferably apply the financial consequence to the user's financial resource as part of its financial accounting and management processes. For example, if a user accepts to spend $1000 with a merchant over three months and the system determines that the user has failed, the system apply a fee to the user's financial account and use all or a portion of that fee from the user to transmit a payment to the merchant. As a result, the merchant can receive a payment or an amount approximate to the amount that the merchant would have received if the user had actually used the saving or discount offer. As a matter of clarification, the financial level of commitment of the user can be distinct from the commitment to use an accepted savings or discount offer. A financial transaction card such as a debit or credit card can be integrated into the systems and process. The card can be used by the users to conduct transactions with merchants. The card can be the key to having access to the savings or discount program with the provider. The card can also assist in providing the service as an "in-account" service (e.g., one that is applied as part of the financial account system that manages the user's personal financial account).

The card can be linked to a spending account of the user. A debit or credit card is generally accepted and has widespread adoption and understanding by the consumers. The financial value currently available in one or more accounts linked to the physical card is used to pay for transactions. This is sometimes referred to as a first data value. When a user transacts business with card, related systems pay the merchant for the price of the goods or services offered by the merchant. For example, the merchant receives payment for the currently listed price of the good when the user purchases the good in the merchant's store. The transaction data resulting from the sale is received by the account system that is linked to the card and the data is processed. The processes determines whether user transactions involved accepted offers of that user with that merchant. If such a situation is detected, a process is implemented by which the saving or discount is applied to the financial account (the financial account data) and saving or discount is realized in the user's account. The updated account value can be generated in real time or after a period of time. As part of the process, the system can automatically identify that an accepted savings or discount offer was used and implement a process by which the merchant issues a payment to the corresponding user that used the accepted offer (e.g., by sending payment to the account management system that handles the user's account). Payment by the merchant can be condition on whether the savings is applied to the user's account. The user can then have an updated higher account value post-transaction when they participate in the program.

The principles and embodiments of the present invention can also relate to a system that provides a user with an investment account that is designed to provide a return on investment and supply the user with savings, discounts, and/or rewards. The discount or savings may be applied when the user makes purchases with an allotted amount of funds, and the rewards may be provided as a function of the amount used for purchases, to the amount of the allotted funds. In this context, funds can also refer to credit or other financial resources available to the user for use in spending. If desired, the reward may be calculated as a function of the amount deposited in an investment account, such as an annuity account.

The principles and embodiments of the present invention can also relate to a financial transaction card (e.g., a credit or debit card) linked to a designated account value using an identification code that can be specifically associated with the user's account and the card. For convenience and clarity, the terms financial transaction card, credit card and debit card may be used interchangeably or in combination to refer to a financial device used to engage in transactions with other parties, such as merchants and vendors. However, those of ordinary skill in the art will understand that there are distinctions between various different types of financial transaction cards, and each may have its particular advantages and disadvantages. In addition, in this context, a discussion of sufficient funds or limits can include a financial value that is incorporated into the account as a credit limit, overdraft protection, or other type of available credit (which may establish a limit associated with available credit, e.g., money on deposit).

Principles and embodiments of the invention can also relate to a computer implemented method of accumulating value (e.g., reward value) in a financial account from the use of an associated debit or credit card, which comprises creating the financial account for a user in a non-transient computer memory, depositing an investment amount in the financial account and recording the amount in the computer memory, linking a debit or credit card to the financial account, specifying a predetermined time period within which a percentage of an amount purchased using the credit or debit card is credited to the user's account as a reward, wherein the credited amount may be used for future spending, receiving data at an account management system when the user's debit or credit card is used in transactions with a previously identified merchant(s), wherein the data includes the amount of the purchase, crediting a percentage of the purchase amount to the customer as an accrued value, and storing the credited amount in the computer memory, tracking the amount purchased using the credit or debit card against the total amount available as a reward for purchases, determining a remaining amount available for purchases by subtracting the credited amount from a predetermined available amount established for rewards within the time period, and preventing the crediting of a percentage of the purchase amount to the financial account when the amount purchased using the credit or debit card exceeds the total amount available for rewards from purchases in a predetermined time period.

The account management system, user interface, first communication system, merchant interface system, second communication system, and payment processor may be dispersed elements or nodes. The communication between the system elements may be facilitated using hardware, software, firmware, and communication lines that provide communication paths between the various system elements. The communication paths may be wired and/or wireless, and may implement different communication protocols to convey data between the system elements. They may also comprise direct communication paths or include paths through an intermediary, such as an Internet or cellular service provider.

FIG. 1A illustrates an embodiment of the components and processes of the system for performing data transactions involving the account management system implemented as part of a secure financial network. At step 10, one or more account management systems are implemented for managing one or more secure financial accounts of users. The secure financial accounts include financial data comprising personal user information and a first data value tied to an account for executing transactions. The account management system tracks user transactions and applies transaction data (e.g., transaction data received from merchants) to the secure financial accounts and/or first data value over time. At step 20, a secure computer system is implemented in a network of one or more of the account management systems that manage the financial accounts, which may reside, for example, at a financial institution or account provider. The secure network may include, for example, a firewall, and the communication paths between the various system elements may be secured, for example, using an encrypted channel and/or a dedicated communications pipe.

A mutually-designated interactive relationship can be implemented by individual users designating in a system certain personal information and personal commitment to one or more future transaction activity, by merchants providing in a system certain savings offers for use with the merchant and by allowing merchants to selectively transmit savings offers to users in response to the users personal information and/or commitment. The first data value may be a value specified by the system (e.g., one or more systems) in relation to the financial data (e.g., current account balance or available credit), and may include an amount that is pledged for a specific use or "budget type" category of spending, such as groceries, utilities, gas, etc. The system can provides interactive features that permits a user to specify a budget amount and a related budget type. The system can permit a user to associate more than one budget type with a designated budget amount. As such, the first data type may also represent an amount that is pledged for numerous uses or budget types (e.g., $5,000 pledged for groceries and gas combined). Based on the data value and budget type and/or the personal information provided by the user, merchants may transmit offer messages to the user via the one or more account management systems. The user may then accept one or more of the merchant offers, and use a financial transaction card linked to the financial account (or to the first data value) to purchase products and/or services from the merchants.

At step 30, the secure computer system is configured to manage and apply the merchant offers to user financial accounts in cooperative relationship with the one or more account management systems. For this purpose, as shown at step 40, the computer system is configured to receive and store a database of merchant offers that have been accepted by corresponding users, to receive transaction data from merchant transactions into the account management system, to compare transaction data to accepted offers and to automatically apply accepted offers from the database, based on merchant identifiers and whether the linked personal transaction cards were utilized to execute the merchant transactions. Each merchant may be assigned multiple merchant identifiers, and the identifiers may be associated with the merchants or, alternatively, may be associated with affiliates of the merchant. Thus, for example, in the event the merchant is a business (e.g., a hotel) with numerous affiliated brand names, the offer would apply to all purchases with any of the affiliated brands.

At step 50, the one or more account management systems manage the financial accounts in accordance with data characteristics of accepted merchant offers by deducting the amount of qualifying purchases from the user's account value (or first data value) and, if applicable, adding value to reflect qualifying discounts, savings, or other event that increases the value of the financial account (or of the first data value).

Figure 1B:
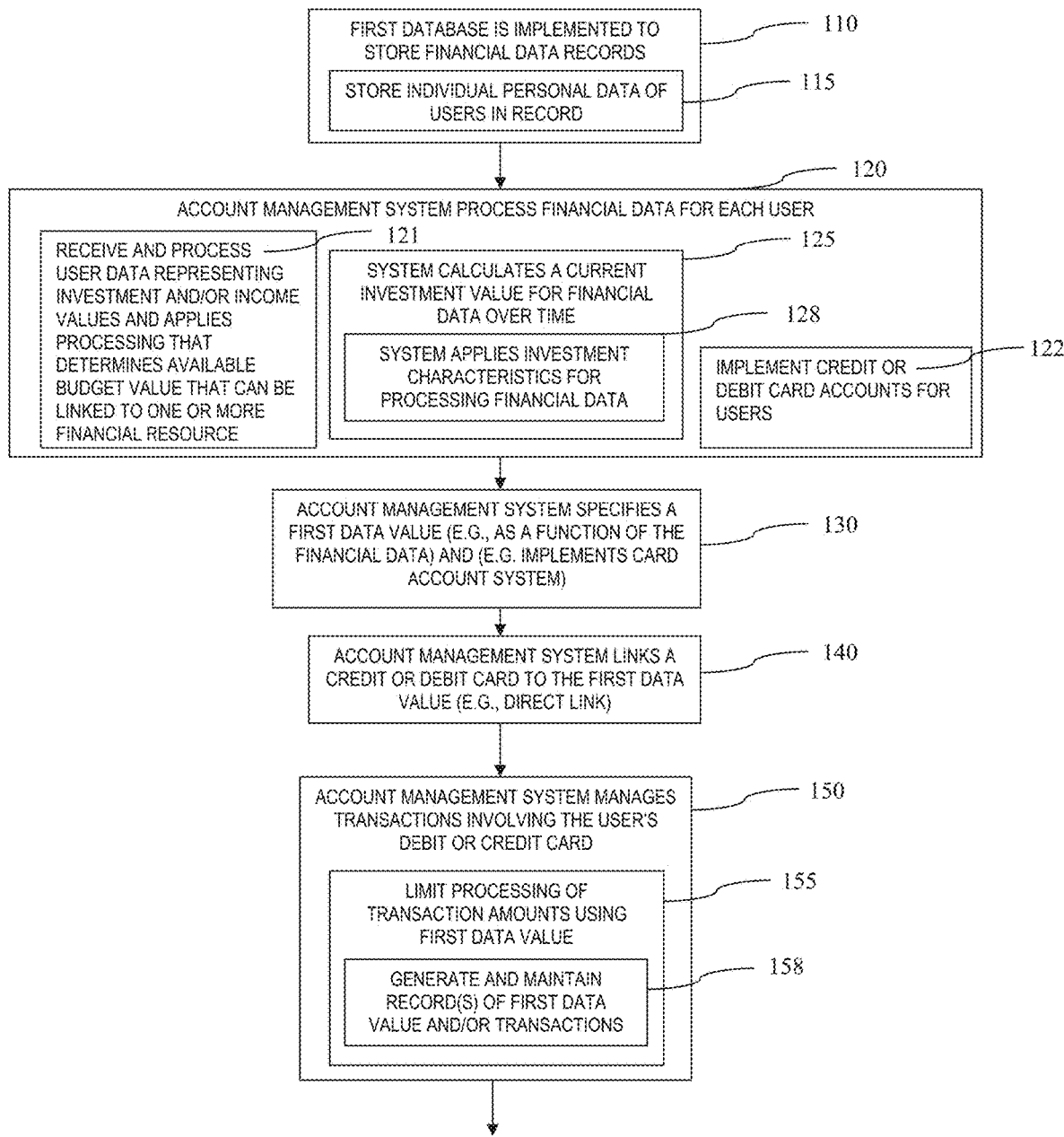
FIG. 1B illustrates an embodiment of the components and processes of a system for performing data transactions involving the account management system.

FIG. 1B illustrates an embodiment of the components and processes of the system for performing data transactions involving the account management system. A database can be implemented to store a plurality of records, as presented in step 110, which may be financial records of one or more user(s), where the financial records may comprise financial data and personal data of the user(s). A non-transitory computer readable media may store the database which can be configured to record values in an account created for a user. The account management system may store individual personal data for each of the users along with the financial data in each of the database records, as shown in step 115. The individual personal data may be associated with the user's financial data, so that a user's personal data may be used to identify and access the financial data stored in each user's record and distinguish a specific user's record from other users' records. Data in the records may have been entered manually or automatically, such as when a consumer opens an investment account with the investment account provider.

The financial data may comprise an investment amount that may be recorded as a monetary value (i.e., in terms of a currency) or a quantity of investment products and their individual values (e.g., stocks, mutual funds, bonds, certificates of deposit, precious metals, etc.). The financial data may also comprise one or more investment characteristics, which may be, for example, an interest rate, a duration that the amount will be invested and/or earn interest, a current yield, a rating by an agency, a description of the investment, a unique identifier (e.g., a stock ticker or a CUSIP) and/or penalties for withdrawal of an amount prior to the end of duration.

The financial data record(s) for the user(s) may also comprise at least a first data value that may represent a portion of an investment amount. The first data value may be recorded as a value separate and distinct from the investment amount, and modified without affecting the value of an invested amount.

The personal data may include a user's name, address, zip code, telephone number and other personal identifying information, for example, age and social security number. The personal data may also include demographic data, for example, age, political affiliation, gender, home ownership, employment status, income, and asset values. The personal data may also include a description of a user's historical purchase behavior. A personal identification code, which may be an account number or user ID, may be included in a user's personal data to allow the account management system to associate the user with the stored financial data and subsequent transaction data.

The electronic database records may be comprised of fields for the one or more categories of the financial and personal data and fields for the values applied to each of the categories.

The account management system may be configured to process the values stored in the financial data records, as shown in step 120. The account management system may also be configured to receive and process user data representing investment and/or income values and apply processing that determines available budget value that can be linked to one or more financial resources, as shown in step 121. The account management system may also be configured to generate and maintain the record(s) to keep stored data values updated and current, and correctly associated with the associated user(s) utilizing their individual personal data, as shown in step 128. The investment characteristics may be used to vary the values of the financial data over time, as shown in step 125. For example, a financial data value may be increased monthly based on an interest rate, and the new financial value with added interest stored in the financial data record to replace the old value. The value may be recalculated each month for the duration of the investment using the one or more investment characteristics for each user having associated financial data.

The account management system may also be configured to specify a first data value as a function of the financial data, as shown in step 130. The first data value may be a value specified by the user in relation to the financial data (e.g., inputted by the user), or a value determined by the account management system using the financial data (e.g., current available balance). The specified first data value also may be an amount segregated from the investment amount or a designated amount of the investment amount that may be pledged for a specific use, but not segregated from the total amount.

In one embodiment of the invention, the financial value of a pledge is tied to the financial investment account and is a limiter as a function of the user's ability to commit to the amount pledged, as measured by personal information, e.g., income, bank account savings, amount invested in investment account, etc. In an alternative embodiment, the financial value or pledge is not tied to the investment account, but rather creates a restriction, such as requiring collateral, before the amount of the pledge will be authorized and available to the user. In this way, committed funds can remain invested in the investment account, but act to collateralize the commitment. If the user is unable to satisfy the pledge, or otherwise defaults on his/her obligations, the collateral, or other value required by the restriction, may be used to pay the obligations of the user (e.g. a penalty).

For example, an account provider may be the provider of investment accounts or products such as annuities, pensions plans, or 401(k) accounts. A system is implemented by the account provider to maintain and manage the investment account or product, which is generally referred to herein as an investment account. An investment account is distinct from other types of accounts because that account is developed for investment (e.g., long term holdings) and accrual of value in the account. Such accounts have restrictions on spending and the number of withdrawals that may be taken. Supporting systems typically prevent withdrawals above a certain minimal number and/or apply withdrawal charges for each withdrawal (e.g., 10% of withdrawal as measure of prevention). Note that some investment products can sometimes reduce or minimize such restrictions after an initial period or can still be investment accounts based on other parameters (e.g., no withdrawals are available at all until the product matures). Non-investment accounts such as checking accounts are implemented and managed by account systems for the purpose of managing everyday transactions and for facilitating spending by consumers. Such accounts typically have no restrictions on the number of withdrawals or transaction per month and may have no fee or have monthly fees for providing the checking type services. In this example, a second account separate from the investment account is implemented and can be opened and maintained by the same provider and provider system. Alternatively, the second account may be a sub-account associated with the investment account and, in this manner, comprise a portion of the investment account. The second account is a checking or checking type account directed to spending by consumers. The second account may be linked to the investment account and is at least one source for transferring financial value into the second account. The system can include a recurring activity that performs a transfer from the investment account to the second account that records a funding event into the second account. The funding event can, for example, be triggered as a result of annuity payments or 401(k) payments or income from the investment account. As such, the value represented by the current state of the second account is a function of the investment account and can include other factors such as spending. Transaction requests such as spending related data received by the system managing the second account are processed by the system and are limited by the current value of the second account for that individual consumer or user. If desired, other related data such as credit or overdraft value can be incorporated and specify the limit and the system's operation when transaction data is received and processed. An investment account can include sub accounts or related accounts if desired. Depending on the situation, it is possible to have multiple secondary accounts linked to an investment account. The "second account" can also be other types of accounts such as a credit card account.

A financial transaction card, such as a credit or debit card, may be linked to the financial data record of a user, as shown in step 140. The credit or debit card may be an existing card that the user has, or it may be a newly issued card provided by the financial institution that is administering the investment account. The credit or debit card can be linked to the first data value stored in the financial data record (e.g., checking account) of the particular user, so that the first data value can be reduced by the amounts of purchases made using the card. If desired, the first data value can be dependent on the amount in the investment account (e.g., due to monthly or periodic predetermined transfers). A consumer can also specify a pledge based on their personal budget. The purchase amount can be deducted from the amount of the investment that was previously pledged for such purchases. The credit or debit card may also be associated with an offer made by a specific merchant and accepted by the card user.

The card may be used by the customer to engage in transactions at a merchant's transaction site, which may be, for example, a point-of-sale system or a website, and the related transactional information may be communicated from the merchant or a payment processor through a network to the account management system.

The account management system may be configured to manage transactions involving the user's credit or debit card, as shown in step 150. The user can use the credit or debit card to engage in transactions with merchants to make purchases, and the transaction data can be transmitted to the account management system over one or more networks and/or telecommunication lines. The account management system can determine if the user has sufficient funds recorded in the first data value, and limit processing of transaction amounts using the first data value, as shown in step 155. The system may compare the amount of the transaction communicated from the merchant with the first data value stored in the user's financial record. If the amount recorded in the first data value is less than the amount of the transaction, the account management system can limit the processing of the transaction to the amount of the first data value and transmit the fact that there were insufficient funds for the entire transaction amount back to the merchant. The system will receive a stream of data specifying spending transaction activity resulting from transactions of the many consumers and is configured to differentiate and manage, apply, and track appropriate associations, limits, savings, and discounts.

The account management system can also generate and maintain the records of the first data value and/or transactions, as shown in step 158. The account management system can create or modify entries in the database for a user's financial record when new information is received for transactions. The data stored in the first database 900 should be synchronized with transaction data received by the account management system 950, so the stored data is updated and current before any subsequent transaction data may be received and/or processed. The amount of each transaction may be maintained as an historic record in case corrections or recreation of a first data value is required.

As financial data changes over time, the account management system may maintain changes to other financial data values. As the user's personal information changes, updates may also be made in the record, so that the correct information is stored in the database.

Figure 1C:
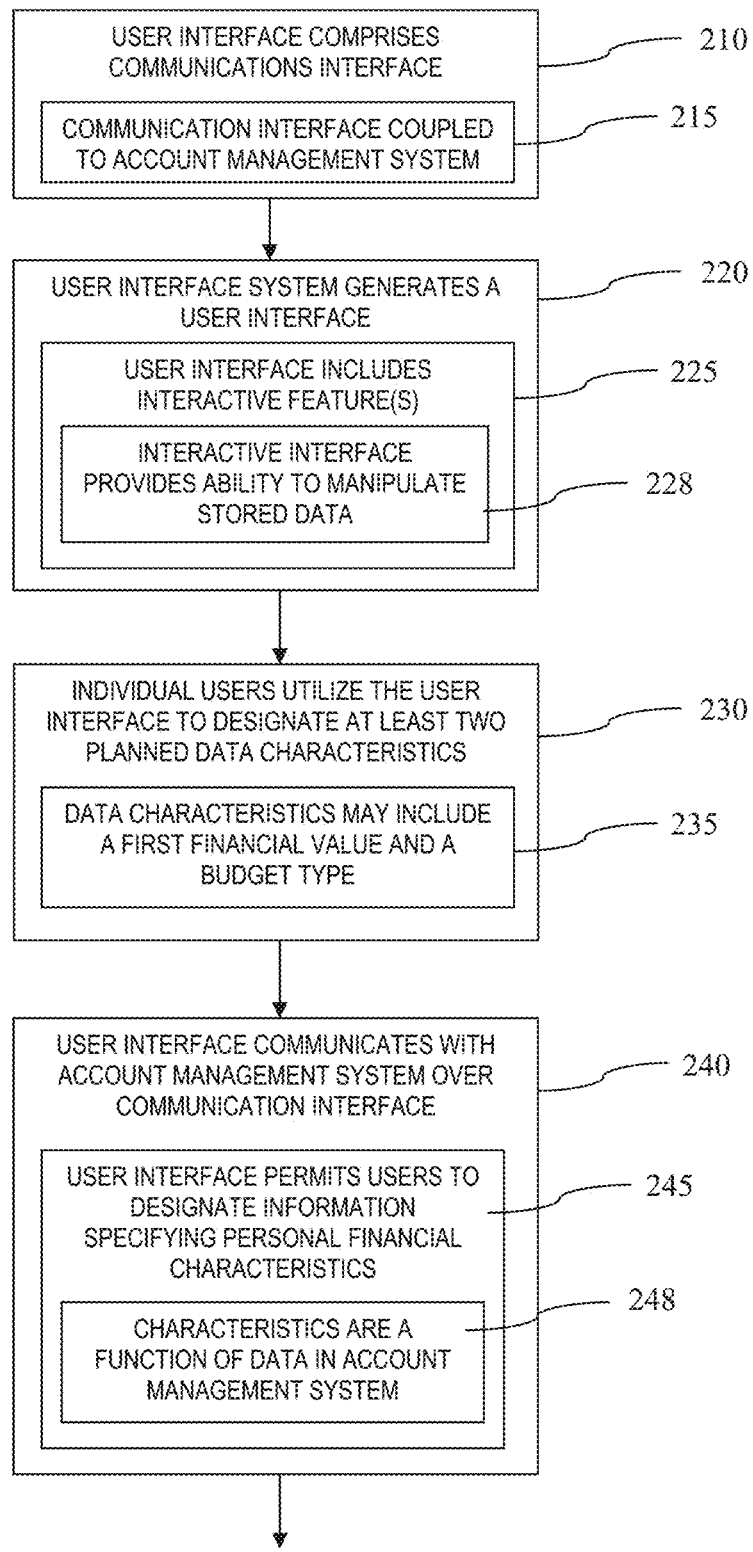
FIG. 1C further illustrates an embodiment of the components and processes of the system for performing data transactions involving the user interface system.

FIG. 1C further illustrates an embodiment of the components and processes of the system for performing data transactions involving the user interface system. A user interface system, which may be implemented as part of the backend account management system, can comprise a communication interface, as presented in step 210, that can be implemented and configured to allow a user to communicate with the account management system, as shown in step 215. The user interface system causes a user interface to be presented to the user on one or more user devices, such as, for example, a personal computer, smartphone, or tablet. The user interface system may present the user interface, for example, using an Internet browser application or, alternatively, via a software program (e.g., an "app") resident on the user device. The user interface may provide access to the financial records of one or more user(s), where the financial records may comprise financial data and personal data of the user(s). Access through the user interface may require use of a code number and/or a personal identifier number that is associated with the data records prior to access being granted.

The user interface system may be configured to generate a user interface, as shown in step 220, where the user interface can comprise one or more interactive feature(s), as shown in step 225. The interactive features may allow a user to manipulate data stored in the database and/or account management system, as shown in step 228. The user may be provided features that facilitate entering data into or retrieving data from the account management system, and changing data values to update stored personal and financial information in the database. The user may manipulate their individual personal data and associated financial data.

The user interface may provide features that individual users can utilize to designate at least two planned data characteristics, as shown in step 230. The two planned data characteristics may be a first financial value and a budget type, as shown in step 235. The user may be provided fields to enter values or options that may be selected by the user from a predetermined set provided by the account management system. The user may specify a first financial value that indicates an amount of funds the user is willing to pledge to make purchases, and a budget type that indicates the category of goods that the user intends to purchase with the designated amount of funds. The first financial value may be an amount of money set aside in a spending account for buying particular product(s) or products sold by a particular type of merchant. The budget type may indicate a particular category of product(s), for example, groceries, home appliances, automobiles, hotel rooms, airfare, or home improvement materials, or it may indicate particular merchants that may supply more than one category, for example, Home Depot®, Chevrolet®, Trader Joe's®, Delta Airlines®, Hilton®, A&P®, and Sears®. If desired, the system can permit a consumer to specify a single item. However, the system is preferably configured to match the budget categories and habits of consumers and to allow merchants to compete for those budget categories. Typically, budgeting behavior will involve specifying categories of expected spending such as groceries, automotive, education, vacation, taxes, housing, medical, and significant ticket items (e.g., a new computer or car). Individual items with a category do not typically represent a sufficient dollar amount to be applied and used in the system unless the item is projected to be above a certain financial threshold, such as $1,000. The categories can be electronically tagged and used for matching with merchants.

The user interface can communicate with the account management system over the computer interface, as shown in step 240, where the account management system may store individual personal data for each of the users along with the financial data in each of the database records. If desired, the user interface may restrict the user's access, ability to manipulate data, and in designating information to specify various transactional characteristics, as shown in step 245. The transactional characteristics may be functions of the financial data stored in the database records, as shown in step 248. For example, the system can provide the user with the opportunity to select a budget category, e.g., groceries, and a monthly dollar value, e.g., $1,500. If desired, the system can be configured to receive the information and compare it to user related data. For example, the system can compare the budget dollar amount to the consumers current account value or to the recurring (e.g., monthly income) that the consumer will be receiving and can block or manipulate the budget (e.g., specify a lower number if it shows insufficient funds) when the comparison results in showing that the consumer entered budget is not consistent with the account information. If desired, the system can setup individual subaccounts for each budget category for a consumer. The user interface can be delivered through a browser, mobile application, or other software through data communications with user's personal devices.

Figure 1D:
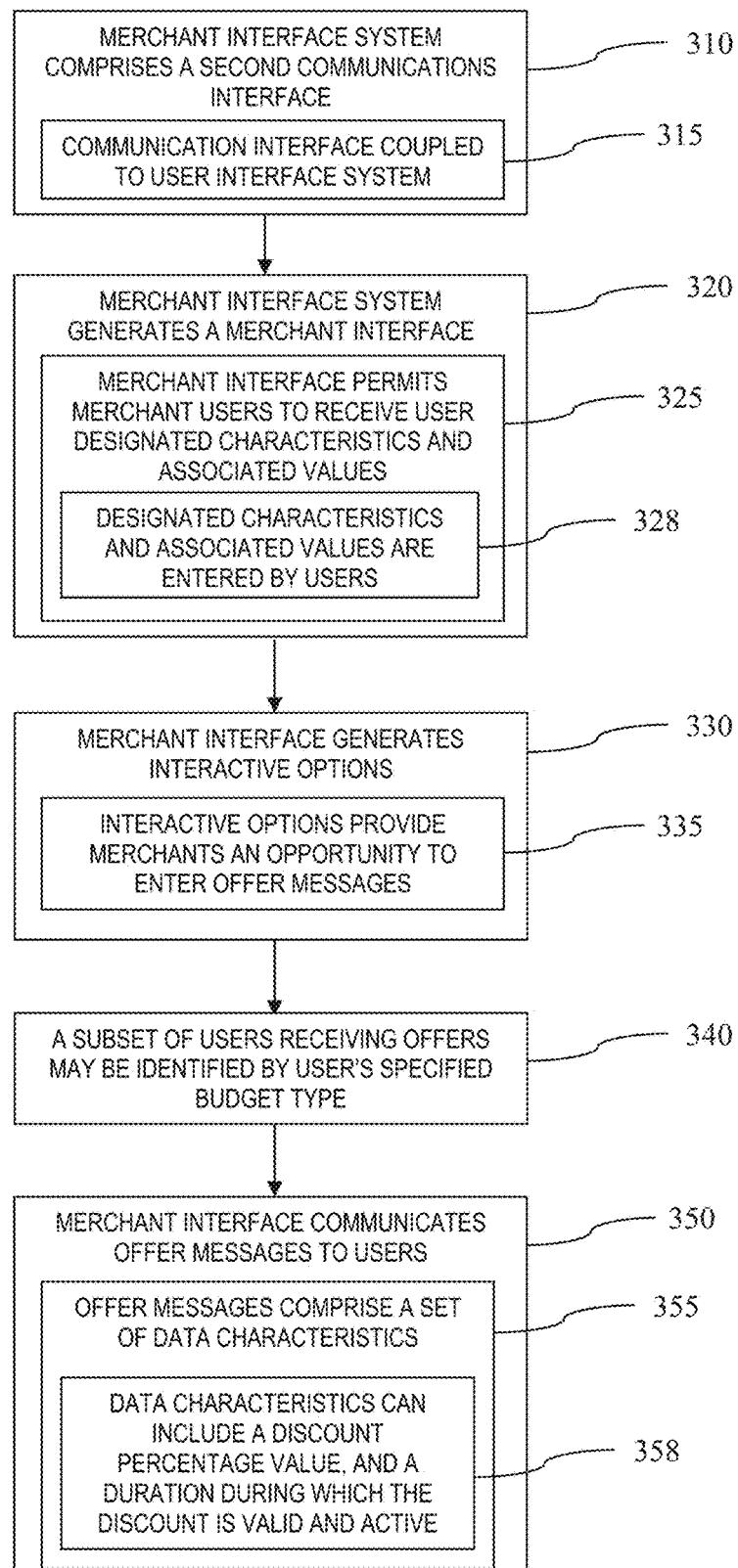
FIG. 1D further illustrates an embodiment of the components and processes of the system for performing data transactions involving the merchant interface system.

FIG. 1D further illustrates an embodiment of the components and processes of the system for performing data transactions involving the merchant interface system. A merchant interface system, which (like the user interface system) may be implemented as part of the backend account management system, can comprise a second communication interface, as presented in step 310, that can be implemented to allow a merchant to communicate with the user interface system, as shown in step 315. The merchant interface system causes a merchant interface to be presented to the merchant user on one or more merchant devices, such as, for example, a personal computer, smartphone, or tablet. The merchant interface system may present the merchant interface, for example, using an Internet browser application or, alternatively, via a software program (e.g., an "app") resident on the merchant device.

The user interface system's first communication system may be coupled with the merchant interface system's second communication system to allow those merchant and user interface systems to communicate with each other, as shown in step 315. For example, where both the user interface system and the merchant interface system are part of the same backend account management system, communication between both interfaces may be easily accomplished. The merchant interface system may generate a merchant interface, as shown in step 320, which permits the merchant user(s) to receive user designated characteristics and associated values, as shown in step 325. The user(s) may specify particular personal and financial characteristics that may be used to identify a user as a part of a subgroup based upon their demographics. The user may designate which characteristics they wish to represent himself or herself in a profile, and/or enter values for the designated characteristics, as shown in step 328, for example, a user may designate "age" as a profile characteristic and enter a value for his or her age in a field of the user interface. The characteristic(s) and value(s) may be communicated from the user interface system to the merchant interface system. Preferably, the merchant may not receive information regarding the user's personal and financial data other than the specific characteristics designated by the user, and undesignated characteristics may be treated as protected data that would not be provided outside of the account management system to protect user privacy and anonymity. For example, certain data can be held securely to protect the consumer's privacy. It is also possible, in some embodiments, for the merchant interface system not to receive any of the user's personal or financial data.

The merchant interface system may generate interactive options, as shown in step 330, where the options provide the merchant an opportunity to enter offer messages, as shown in step 335. The offer messages may be based on the merchant's desire to obtain a level of sales revenue from a subset of users. The subset of users may have been identified using the user's designated characteristics, which may include a specified budget type, as shown in step 340. A particular merchant may choose to filter out potential customers based on the different specific characteristics, such as the budget type specified by the user. For example, automobile makers/sellers may choose to exclude a user that specifies one or more a budget types (e.g., groceries), whereas a merchant like Trader Joe's® grocery stores may choose to actively include such users. The system can be implemented to automatically match consumers and merchants using data associated with each such profile data, budget category, or vendor category. The merchant interface can he delivered through a browser, mobile application, or other software through data communications with merchants' business devices.

In an alternative embodiment, the merchant interface system does not receive the user's designated characteristics. Rather, the merchant uses the merchant interface to select matching criteria for certain merchant offers that are made available to all qualifying users, rather than a select one or group of users. For example, the merchant interface may display a series of categories or filters, from which the merchant can select qualifying characteristics (e.g., budget type, minimum pledge, minimum household income, etc.). The merchant may then communicate the qualifying characteristics and the merchant offer message to the account management system, which, via the user interface system, forwards the merchant offer message to all users matching the merchant's qualifying characteristics. Alternatively, the qualifying characteristics and offer message may be communicated automatically. In this way, users may receive qualifying offers without having to divulge sensitive personal information to merchants.

The merchant interface system may be configured to communicate offers to users over the communication systems, as shown in step 350, where communication may occur over a network. The offers may be communicated manually by the merchant, or may be communicated automatically based on the receipt of qualifying characteristics from a user. The offer messages may comprise a set of data characteristics, as shown in step 355, and are sent to users previously identified based upon their designated characteristics. The data characteristics of the offer message may include a savings offer or a discount percentage value and a duration during which the discount or savings offer is valid and will be honored by the merchant making the offer, as shown in step 358. The duration of the offer may be, for example, for a month, or for an extended duration, such as for a year. The savings or discount percentage value offered to a user may be based on an aggregate spending amount over the duration, or the amount of profit the merchant expects to make on the amount of spending and budget type specified by the user. Preferably, the savings or discount percentage value may be applied to all purchases made with the merchant, and not just on particular items identified as sale items by the merchant. The savings or discount percentage value may be limited to a category of products, for example groceries, if the budget type provided by the user specified that product category. A user may receive savings or a discount on a single item purchase, for example an automobile, by representing to one or more automobile sellers or manufacturers that a specific amount of funds has been committed for the purchase.

A savings offer or discount would be intended to apply to all purchases made with a particular merchant rather than be restricted to a particular product, such as Cornflakes®, a particular brand like Craftsman®, or type of product, for example, grape juice or round-trip airfare. Other embodiments can include a saving offer that applies restrictions such a restriction to a particular brand. The savings offer or discount is preferably applied to all purchases made over a period of time, and not limited to a single transaction after receiving the savings or discount, such as with a single use 10% off coupon valid for all items purchased at the same time or a one-time discount on a bill at a restaurant. However, variations may exist (e.g., an offer to sell a single item such an automobile).

The offer messages may be "pushed" to the users automatically or manually by the merchants, without the user making any request, by the merchant selecting particular criteria, and requesting the account management system to notify all users fulfilling the criteria of the offer being extended by the merchant. Conversely, the offer may be "pulled" by the user providing designated characteristics and associated values, which may include the first financial value and a budget type, from one or more merchants, and interested merchants responding with an offer message communicated to the user. In another embodiment, a plurality of merchants may bid on the first financial value through an auction engine. The data characteristics of an offer message may be sent to an anonymous group of users that have designated characteristics identified by the merchant, or the users' designated characteristics may be anonymously provided to the merchant(s) by the account management system. Such communications would not include personally identifiable information, such as names, addresses, social security numbers, phone numbers, etc.

Figure 1E:
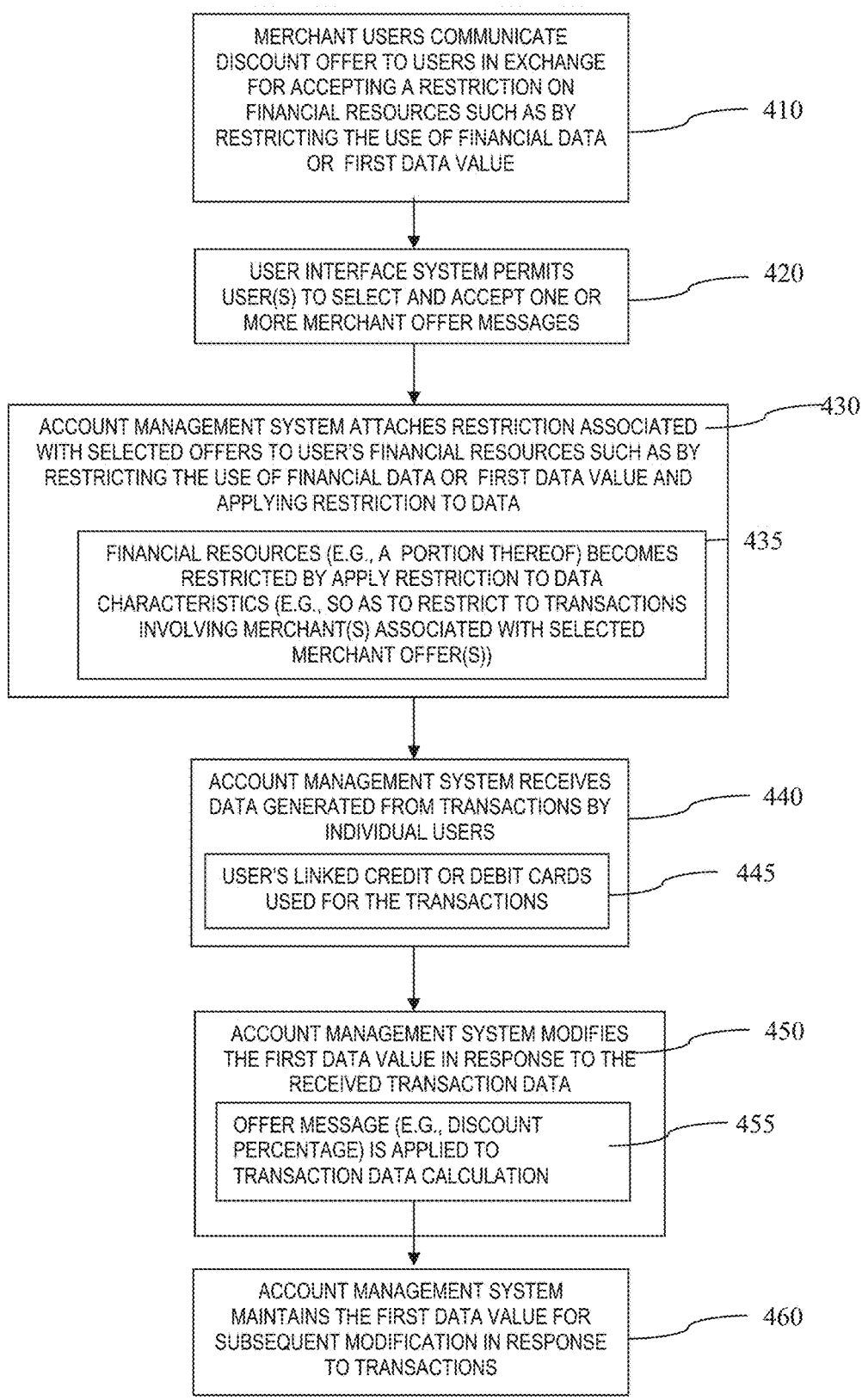
FIG. 1E further illustrates an embodiment of the components and processes of the system for performing data transactions involving the account management system, user interface system, and merchant interface system.

FIG. 1E further illustrates an embodiment of the components and processes of the system for performing data transactions involving the account management system, user interface system, and merchant interface system.

The merchant user(s) may communicate their offer message, which can be a savings or discount offer, to one or more user(s), as shown in step 410. The merchants may require the user(s) to accept a restriction on the user's first data value in exchange for the savings or discount, such as by restricting the use of financial data or the first data value, also as shown in step 410. The restriction placed on the offer by the merchant may require the user to guarantee a certain spending level with the selected merchant for a specified time period, where a total duration may comprise multiple time periods. For example, a user may promise to spend $500 a month, each month for a year, with a specific merchant. The user may promise to spend the specific amount with the merchant each period in order to receive a certain level of savings or discount on all the purchases. For example, if the user commits $500 per month towards purchases of products sold by the merchant; the merchant may offer a 15% discount on all such purchases made. If the user only commits $250 per month, the merchant may offer only a 5% discount on all such purchases. The merchant may also impose restriction(s) on the user's behavior that, for example, allows the merchant to withdraw the savings offer or discount if the user has not made the agreed upon amount of purchases in a specific period, or may require the user to compensate the merchant for unrealized profits resulting from insufficient purchasing by the user in a period. Restrictions may incentivize the user to spend the full amount pledged by the user to avoid such imposed costs or lost benefits. The offer benefits and imposed restrictions may thereby provide a mutual and credible electronically implemented, tracked, and enforced commitment by both the user and the merchant.

In embodiments of the invention, the user's invested amount may be used to pay for breakage relating to defaults on promised purchases or over-extended debit amounts not covered by the amount of the first data value. The system can detect when a specified period for a savings or discount percentage has expired and trigger an operation that electronically transmits the breakage fee to the merchant (e.g., based on the pro rata portion of the pledged spending that was not used).

The user interface system permits the user(s) to select and accept one or more merchant offer messages, as shown in step 420. A plurality of merchants may make offers to a user, where each hopes to obtain a portion of the user's committed spending amount, as represented by a first financial value.

If the user selects the offer and accepts the merchant-imposed restriction(s), the account management system may attach the restriction associated with the selected offer to the user's account, first data value, or other financial resource, as shown in step 430, and data representing the restriction(s) may be stored in the user's record with the corresponding financial data values and applied accordingly. The restrictions may, for example, restrict the use of financial data or of the first data value. The user may be presented with offers from more than one merchant that provide different savings or discount offers and different restrictions. The user may then select one or more of the offers based on the savings or discounts and restrictions and communicate the acceptance of the one or more offers to the merchant interface system and/or the account management system. In some embodiments, if desired, once an offer has been accepted by the user, utilization of the first data value (or portion thereof) becomes restricted to transactions involving the merchant(s) associated with the accepted merchant offers, as shown in step 435. In such embodiments, if desired, the account management system may store the identity of the merchant and the data characteristics of the savings or discount offer in the user's financial data record, and may be configured to allow only processing of transactions that have been conducted with merchant(s) that are identified in the user's stored record and associated with the first data value. The processing of transaction(s) may also be restricted by the actual amount stored in the first data value to prevent a user from spending more funds than are currently available.

The account management system receives data generated from transactions by the individual users, as shown in step 440, where the account management system may be configured to receive only transaction data from a merchant after an offer has been accepted. The processing of the transaction may also require the user to utilize the credit or debit card linked with the user's record, as shown in step 445. The credit or debit card may be associated with a first data value and a specific merchant, so the card might only be used in transactions involving the amount pledged to the particular merchant. This is one way of associating, tracking, and enforcing consumer budgets captured by individual merchants in using the process.

The account management system may modify the first data value in response to the received transaction data, as shown in step 450, where the transaction data may comprise the amount spent to make a purchase at the merchant. The account management system may process the received transaction data by comparing a transmitted purchase amount to the amount recorded as the first data value, and limit the transaction to the amount of the first data value if the purchase amount is greater, or deduct the purchase amount from the first data value if the purchase amount is less than the first data value. The new amount may then be stored as the first data value. If desired, such processing maintains a current value for the first data value and confirms that the user has sufficient funds to cover the cost of goods purchased in a transaction.

The account management system may apply the savings offer or discount percentage to the transaction data calculation, as shown in step 455, where the savings or discount percentage was communicated as part of the offer message communicated by the merchant. The savings or discount percentage may be used to reduce the amount deducted from the first data value at the time of the transaction, or the savings or discount may be used to add a rebate to the first data value at the end of an accounting period. The savings or discount may also be applied in a different currency, such as reward points, credits, or other indicia of value.

The account management system maintains the first data value for subsequent modifications in response to additional transactions, as shown in step 460. The first data value may be kept current by deducting each transaction as the data is received and updating the amount recorded in the first data value to reflect a remaining amount of funds. By keeping the first data value current and accurate, the account management system can avoid overdrawing on the amount pledged by the user for such purchases.

In other embodiments, a user may designate a personal budget amount for different categories of goods or services, or may subdivide the personal budget amount into smaller portions and communicate the smaller portions in the system. In another embodiment, the user may first receive several savings or discount offers from several different merchants, and subdivide the first data value between the several offers.

Figure 2:
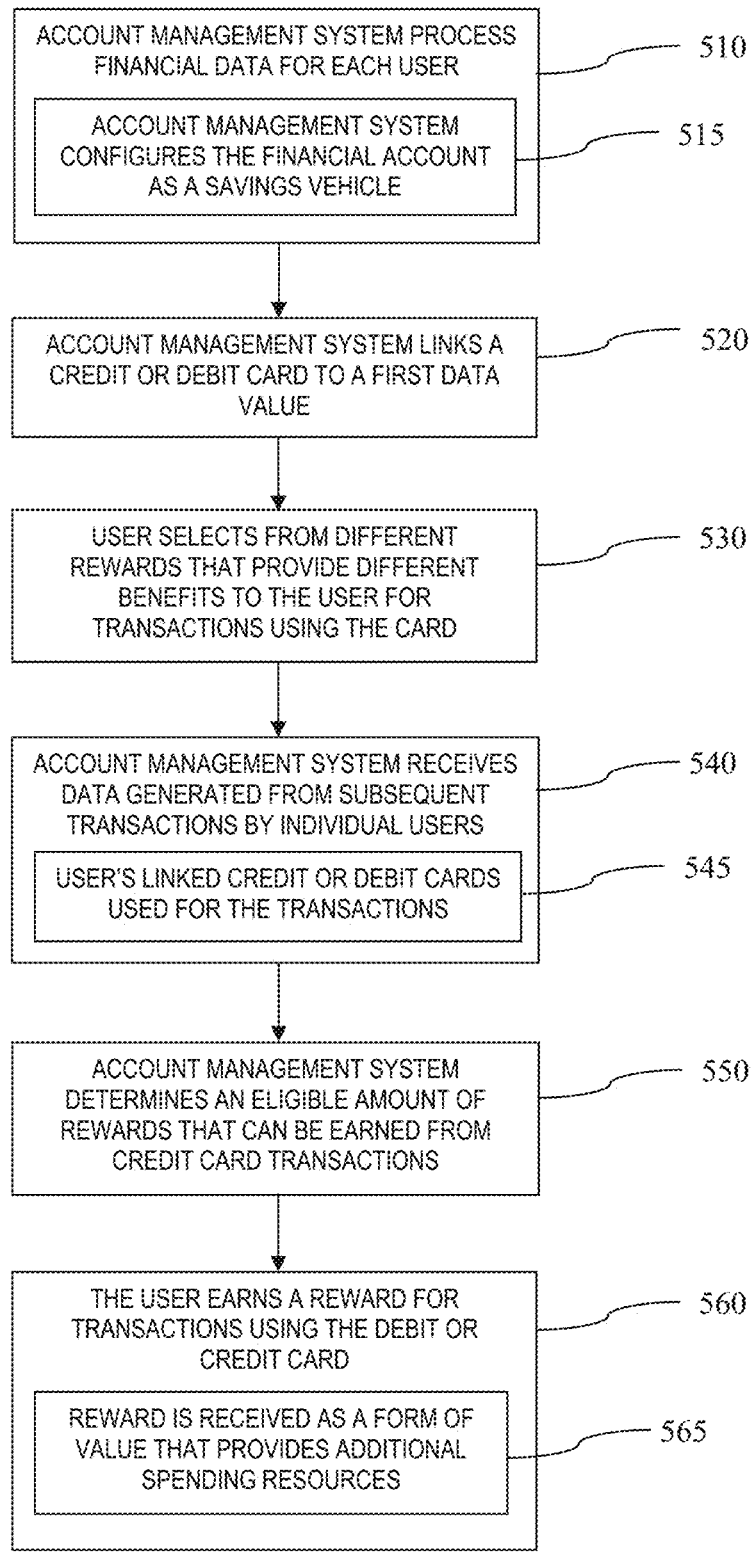
FIG. 2 illustrates an embodiment of the invention, which further comprises the account management system processing the financial data for users.

FIG. 2 relates to an embodiment of the invention in which a user may also accrue rewards in addition to a savings or discount percentage applied to purchases. Different reward programs may be provided to a user, and the user may select one or more reward programs from the options provided. The one or more rewards options offered to a user may provide different benefits to the user, where the benefits may be linked to the user's financial data and obtained by using the debit or credit card for transactions. The benefits to the user may include, for example, additional value added to a spending account value for use with the linked credit or debit card.

FIG. 2 illustrates an embodiment of the invention, which further comprises the account management system processing the financial data for each user, as shown in step 510. A financial account may comprise the financial data, which may include a value for the amount of funds deposited for investment with the system and a value that defines an interest rate to be applied to the investment amount. The financial data may also comprise a data characteristic that applies to rewards. In some embodiments, the user's invested funds and the applied interest rate may thereby form the financial account.

The account management system may configure the financial account as a savings vehicle, as shown in step 515, where the account may be structured to earn value over time in the account for the customer based on an offered interest rate, or other metric. The user may earn interest on the amount deposited in the financial account over time that accrues as increased purchasing power or savings that benefit from deferred tax liabilities.

The account management system may also link a credit or debit card to a first data value stored in the financial account, wherein the first data value may be a function of the financial data, as shown in step 520. The card may be recognized by the account management system as linked to the user's financial account through an identification number, which may also be stored in the user record with the financial data.

The user may be provided options for types of rewards that may provide different benefits, where the user selects from different rewards, as shown in step 530. The rewards may accrue to the user for transactions using the linked credit or debit card, also as shown in step 530.

The account management system receives data generated from transactions by the individual users subsequent to the card being linked to the financial account and a reward being selected, as shown in step 540. The transaction data is generated when the user's credit or debit card is used for the transactions, as shown in step 545.

The account management system may determine an eligible amount of rewards that may be earned from transactions using the debit or credit card, as shown in step 550. If desired, the rewards the customer is eligible for (on the card) could be calculated as a function of the amount deposited in the financial account. When the user actually engages in a transaction with the credit or debit card, the user may earn a reward, as shown in step 560. The user may receive the reward in the form of a merchant discount and/or cash back rewards earned from the purchase of goods or services. In this manner, the financial account gives value to the customer relating to their investment by issuing rewards that are generally higher than interchange rates (i.e., a fee paid between banks for the acceptance of card based transactions).

The user may receive the reward benefit as a modification to a financial data value, for example, an increase in investment amount. The reward benefit may also be received as a form of value that provides additional spending resources as shown in step 565, for example, an increase in the first data value, which provides an increased current spending ability with the debit or credit card. Examples of a system that implements innovative rewards systems are illustratively described in U.S. patent application Ser. No. 13/841,900 filed on Mar. 15, 2013, and International Application No. PCT/US2013/040617, which are incorporated herein by reference in their entirety.

Figure 3A:
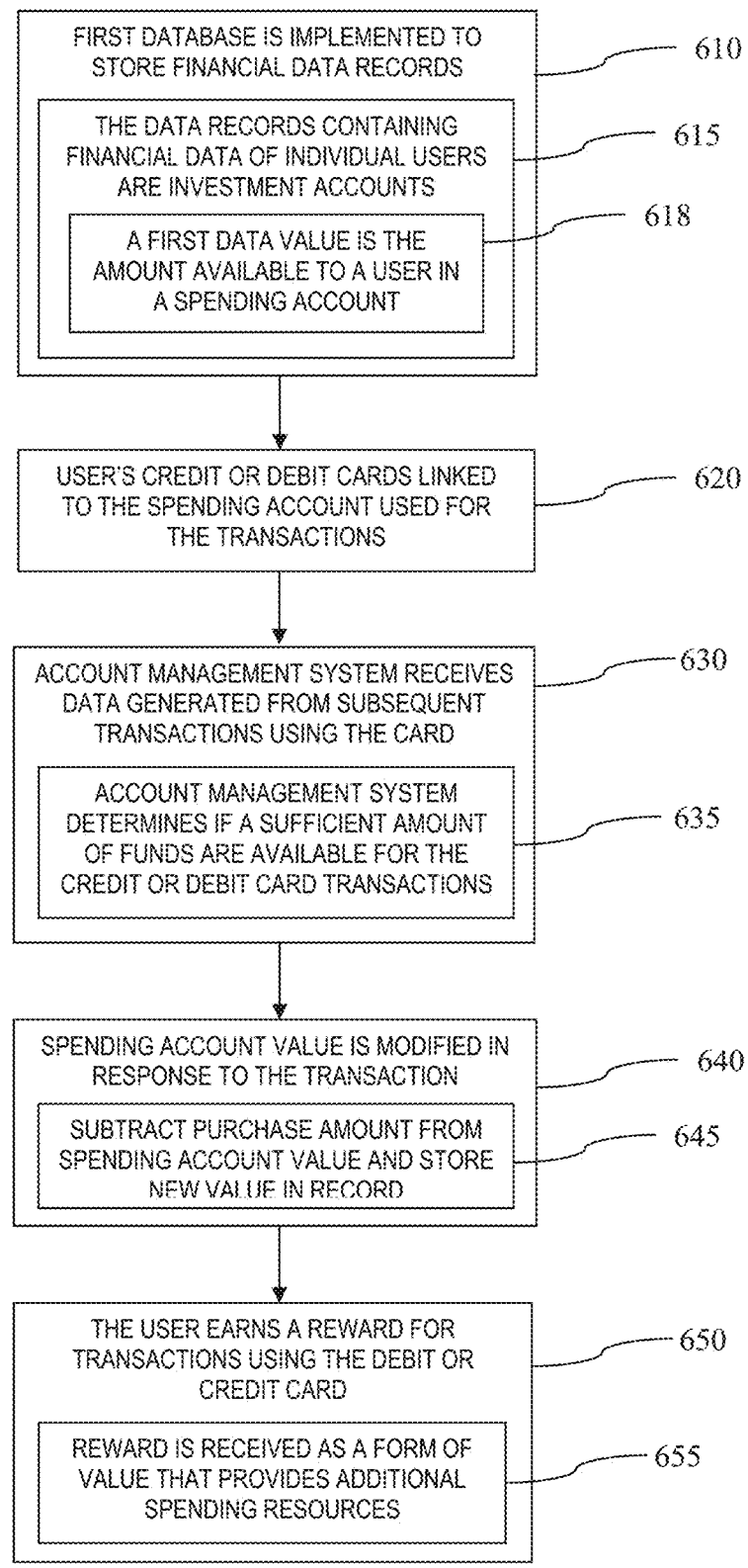
FIG. 3A illustrates an embodiment of the invention in which the records containing the financial data of the individual users represent investment accounts.

FIG. 3A illustrates an embodiment of the invention in which the records containing the financial data of the individual users represent investment accounts, where the investment accounts comprises one or more financial data values stored in the first database as financial data records, as shown in step 610. The investment accounts may have investment account characteristics including at least an interest rate that the account management system uses to modify the financial data recorded in the investment account. A non-transient computer readable medium may have been previously configured to store financial data records comprising the account characteristics in a first database. The investment account can comprise the financial data of an individual user that is stored as such a financial data record, as shown in step 615. The financial data values may include a first data value which represents an amount that an individual user has in a spending account, as shown in step 618. The spending account may have data characteristics including at least a money amount (or budget amount) and a budget type, where the budget type can identify at least a category of products or services for which the money amount can be utilized for transactions using the credit or debit card. The user may have previously designated an amount to be placed in the spending account for subsequent transactions. This designated amount may be an amount the user identifies as a sum available for purchase with merchant(s), and set aside for later spending. The designated amount in the spending account may be represented as a first data value or a portion of the first data value in the user's financial data record. The spending account may be linked to a credit and/or debit card, as shown in step 620, so that transaction data generated by the user can be communicated to the account management system, and the account management system can associated the received data with the correct user record stored in the first database. The credit and/or debit card may be linked to the user's financial record by an identification code generated by the account management system.

The account management system may receive data generated from transactions using the linked debit or credit card, where the transactions may be subsequent to the user designating the amount in the spending account and linking the card to the spending account, as shown in step 630. The transaction data communicated from a merchant to the account management system may comprise the amount of the purchase and an identification code of the credit or debit card.

When purchases are made with the debit or credit card and the data communicated to the account management system, the purchase amount may be compared to the amount in the spending account to confirm that sufficient funds are available to pay for the transaction, as shown in step 635. The account management system performs the calculations to determine whether the value in the spending account is sufficient to cover an entire amount of the transaction conducted with a merchant using the debit or credit card.

In addition, a confirmation may be sent from the account management system (or a processing company) to the merchant to assure the merchant that the user's purchase is covered by a sufficient amount of funds, or inform the merchant that the user does not have a sufficient amount of funds and must provide an additional means of payment to supplement the amount available with the credit or debit card.

The account management system may be configured to modify the user's stored spending account value in response to the receipt of transaction data identifying the user's card and/or account, as shown in step 640. The spending account value may be modified by the account management system subtracting a calculated amount from the stored value of the spending account and recording the new, reduced spending account value in the user's financial data record in the database, as shown in step 645. The first data value would reflect a rolling balance available to the user. The account management system may calculate an amount of the transaction to be the full purchase amount, or a value less than the total purchase amount based on an applicable savings or discount applied to that customer's transactions with the specific merchant, and deduct the calculated amount from the user's spending account. A savings offer or discount (which may be a percentage number) may have a predetermined value, for example, a percentage, agreed upon by the particular merchant and user prior to purchases being made. Savings or discounts may be applied immediately during the transaction, in conjunction with processing by a payment processor. Alternatively, the total amount of savings or discounts accrued for all transactions within a specific time period may also be reconciled post-transaction as part of an accounting process and then refunded, in money or another form of value, to the spending account at the end of the period. It is contemplated that the accounting process will reconcile purchases with offers and apply rewards to customer accounts, invoice merchants for discounts (or rebates) owed, apply any applicable penalties, fees, or adjustments resulting from expired offers or defaults on committed purchases, notify users of upcoming offer expirations, and prepare reports for merchants, users, and system administrators.

The user may also earn a reward resulting from use of the linked debit or credit card, as shown in step 650. The reward may be earned as a financial benefit or incentive that is separate from the savings or discount offer provided by the one or more merchants. The reward may be provided by a financial institution that administers the user's investment account(s), or a third party that handles the investments for the user or manages the credit card transactions. A user may have enrolled in more than one reward program that provides different types of benefits, which may include, for example, an increase accrued to the investment account, or additional spending resources available to the user, as shown in step 655. The additional spending resources may be an amount added to the first data value of the spending account. The account management system may modify the spending account value by the reward amount, which may be added to the spending account at or near the time of the transaction is processed and received by the system or at the end of an accounting period, for example, at the end of each month.

If desired, a maximum amount of reward benefit available for a transaction or for a period may be calculated by the account management system from an investment amount. The amount of the reward provided to the user may be limited to a specific amount based upon the current value of the investment account stored in the database.

Figure 3B:
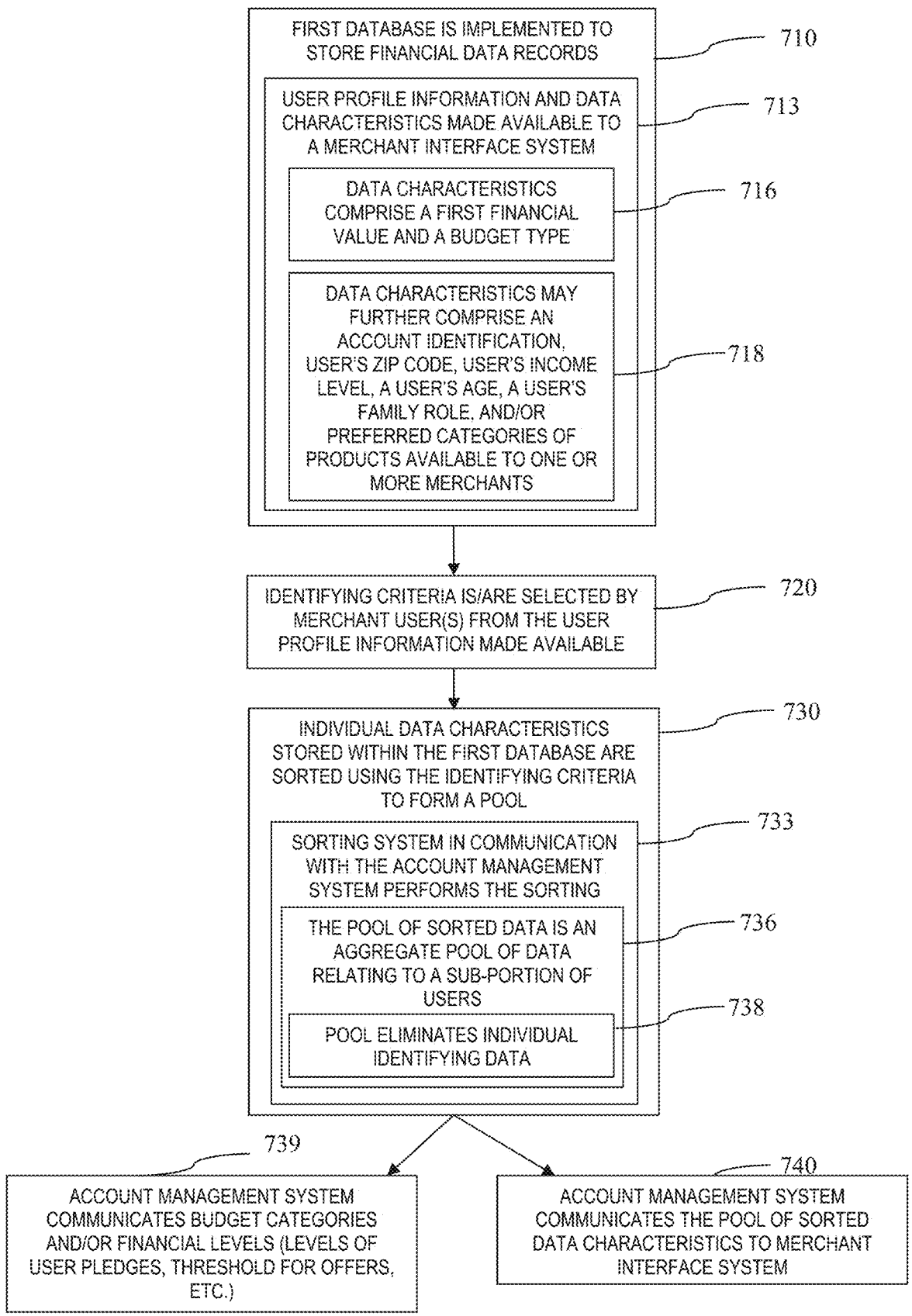
FIG. 3B illustrates an embodiment of the invention in which information and data characteristics relating to a user's profile may be communicated to one or more merchant interfaces.

FIG. 3B relates to the merchant user identifying users with a greater probability of purchasing the goods or services provided by the merchant, and therefore having a higher likelihood of accepting an offer and committing funds towards such purchases with the merchant.

FIG. 3B illustrates an embodiment of the invention in which information and data characteristics relating to a user's profile may be communicated to one or more merchant interfaces. A first database may be implemented to store the financial data records relating to one or more users, as shown in step 710. The financial data records may be configured to hold information relating to an amount that the user has invested, and investment characteristics such as an interest rate that the investment has been earning or is intended to earn, a length of time that the invested amount must remain in the account, and penalties for withdrawal of an amount prior to the end of that time period. User profile information may also be stored in the record with the financial data to specify personal characteristics and demographics of the user. Data characteristics including at least a first financial value and a budget type may also be stored in the financial data record, where the first financial value may represent an amount of money the user intends to spend on a particular category of products or services and the budget type identifies the actual category of products or services. Other data characteristics may include the number of time periods that the user intends to spend the identified amount of money on such products, or a time frame in which the user pledges to spend the specified amount of money. The data characteristics may further comprise an account identifier, a user's zip code, a user's income level, a user's age, the user's family role, and/or preferred categories of products, as shown in step 718. The data characteristics may also include other demographic data, such as prior spending habits, as would be known to those of ordinary skill in the art of marketing and statistical analysis.

The user profile information and data characteristics may be made available to a merchant interface system, as shown in step 713, so the merchant is made aware of the potential for the user to make a commitment with the merchant in exchange for a benefit on such purchases. The data characteristics made available to the merchant may include a first financial value and a budget type, as shown in step 716. The data characteristics may also include the number of periods or length of time that the user will commit or recommit an amount, or a time frame in which the user pledges to spend the specified amount of money.

The merchant may select identifying criteria from the user's profile information, data characteristics, and other demographic data made available by the one or more users, as shown in step 720. The user may have only provided some of the data characteristics, or may have only identified a subset of provided data characteristics as available to other parties in order to retain a certain level of privacy. The merchant user may select particular information and data characteristics to identify a subgroup of users that would be more likely to purchase the goods or services provided by the merchant. The account management system or a sorting system in communication with the account management system, as shown in step 733, may sort the individuals' data characteristics stored within the first database to form a pool, as shown in step 730. The account management system or a sorting system may perform the sorting function of the database records and fields using searching and sorting protocols known to those of ordinary skill in the art of computer science and/or database management. The pool of sorted data may be an aggregate pool of data relating to a sub-portion of users, as shown in step 736. An aggregate pool of data may only specify the quantity of users possessing the particular value selected as an identifying criterion for a data characteristic. For example, the account management system or sorting system may identify a number of stored records containing data indicating that the user has an income level between $50,000 and $75,000. The account management system or sorting system may further identify a smaller number of records in which the user is the mother of the household, and an even smaller number of records specifying the users are between the ages of 25 and 35 years old. The pool of sorted data may eliminate any or all individual identifying data, as shown in step 738, to protect the actual users' identity. The account management system may maintain a record of the actual users having the set of identifying criteria, but personal identifying information may preferably be kept private from the merchant.

The account management system may communicate the pool of sorted data characteristics to the merchant interface system, as shown in step 740. The merchant user may be notified by the account management system that the particular number of users having records stored in the system meet the supplied identifying criteria. The merchant may also be provided with the aggregate set of actual data values from the records. Alternatively, as shown in step 739, the merchant may be provided only with budget categories and/or financial levels (e.g., levels of pledges, thresholds for offers, etc.) associated with qualifying users, who otherwise remain anonymous. The merchant may then process the pool of data to make decisions regarding the type of savings or discount and/or level of discount to offer the users having the criteria.

Figure 3C:
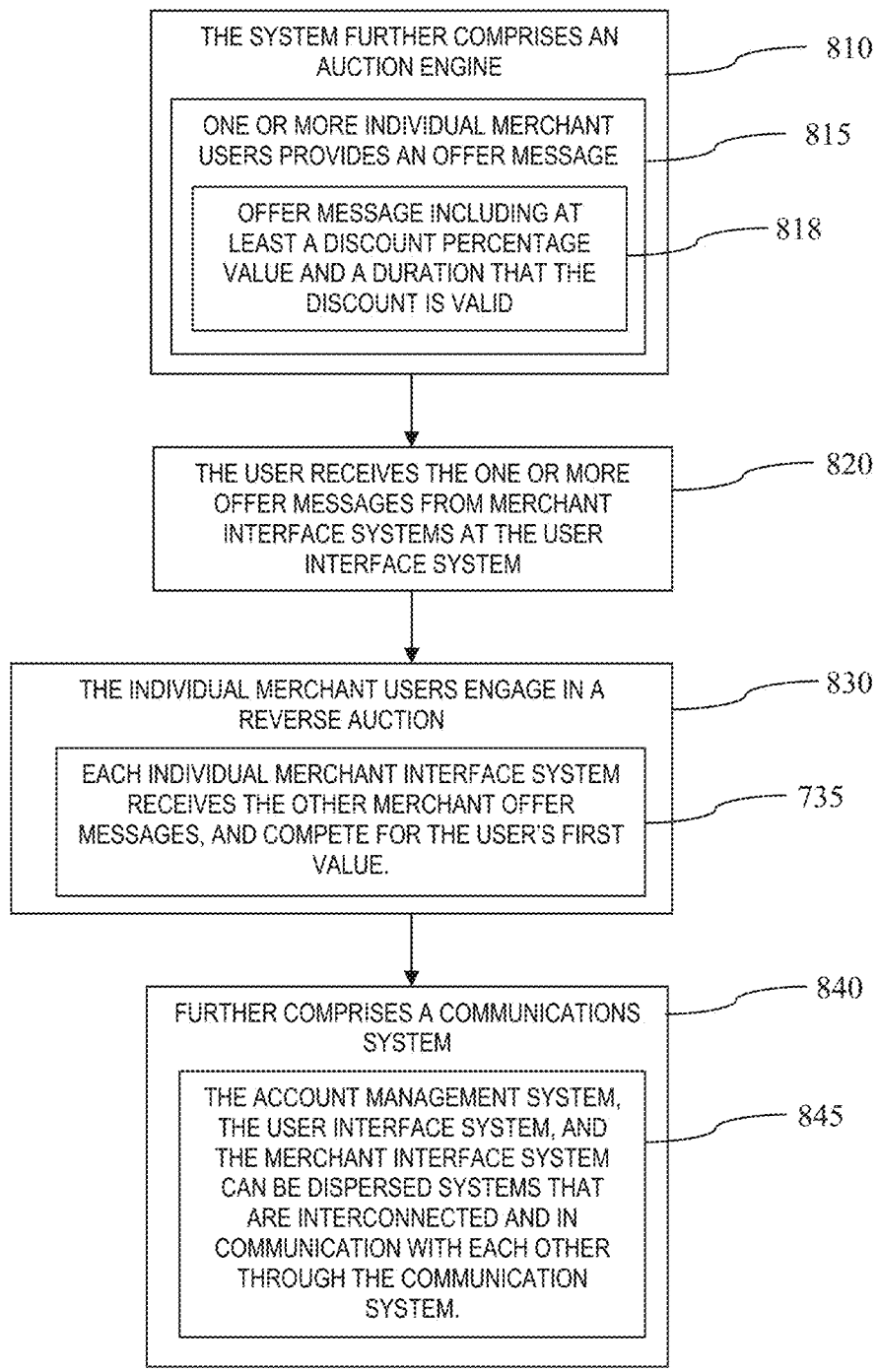
FIG. 3C illustrates an embodiment of the invention which further comprises an auction engine that may enable merchants and users to engage in a reverse auction.

FIG. 3C illustrates an embodiment of the invention which further comprises an auction engine that may enable merchants and users to engage in a reverse auction, as shown in step 810. The auction engine may comprise hardware, software, and firmware that provides confidentiality of communicated data between users and merchant users, and facilitates the exchange of offers and acceptances. The one or more individual participating merchant users may provide an offer message, as shown in step 815. The offer message may be communicated to all the users having a financial record in the database or to a sub-portion of users meeting predetermined selection criteria. The offer message may comprise at least a savings offer or discount percentage value and duration that the savings or discount will be valid, as shown in step 818. The savings offer or discount percentage may indicate the portion of a purchase amount that will be refunded to the user when the purchase is made using the credit or debit card linked to the first financial value. Other methods of reconciliation can also be used (e.g., reduce price before submission to payment processor).

The user may receive one or more offer messages from merchant interface systems at the user interface system, as shown in step 820. The merchant interface system may be in communication with the user interface system over a network, and the offer message may be sent as an email. In another embodiment, the user may be sent a notification with a link to a website or webpage that contains the offer message.

In an embodiment, the merchant users may engage in a reverse auction, as shown in step 830, which may be facilitated by the auction engine. Each individual merchant interface system may receive the other merchant's offer messages, as shown in step 735, so that they are aware of at least the savings offer or discount percentage value and a duration that other merchants are offing to users. The merchant users may then compete for the users' first financial value or value of a spending account, as also shown in step 735, by sending subsequent offer messages with superior terms or benefits that may be more appealing to the users.

The system may further comprise a communication system, as shown in step 840, that may facilitate the sending and receiving of merchant offer messages, users' selection and acceptance of offer messages, and implementation of the reverse auction. The account management system, the user interface system, and the merchant interface system may be dispersed systems or nodes that are interconnected and in communication with each other through the communication system, as shown in step 845. The communication system may also be in communication with a payment processor to facilitate transmission and reception of transaction data.

Figure 4:
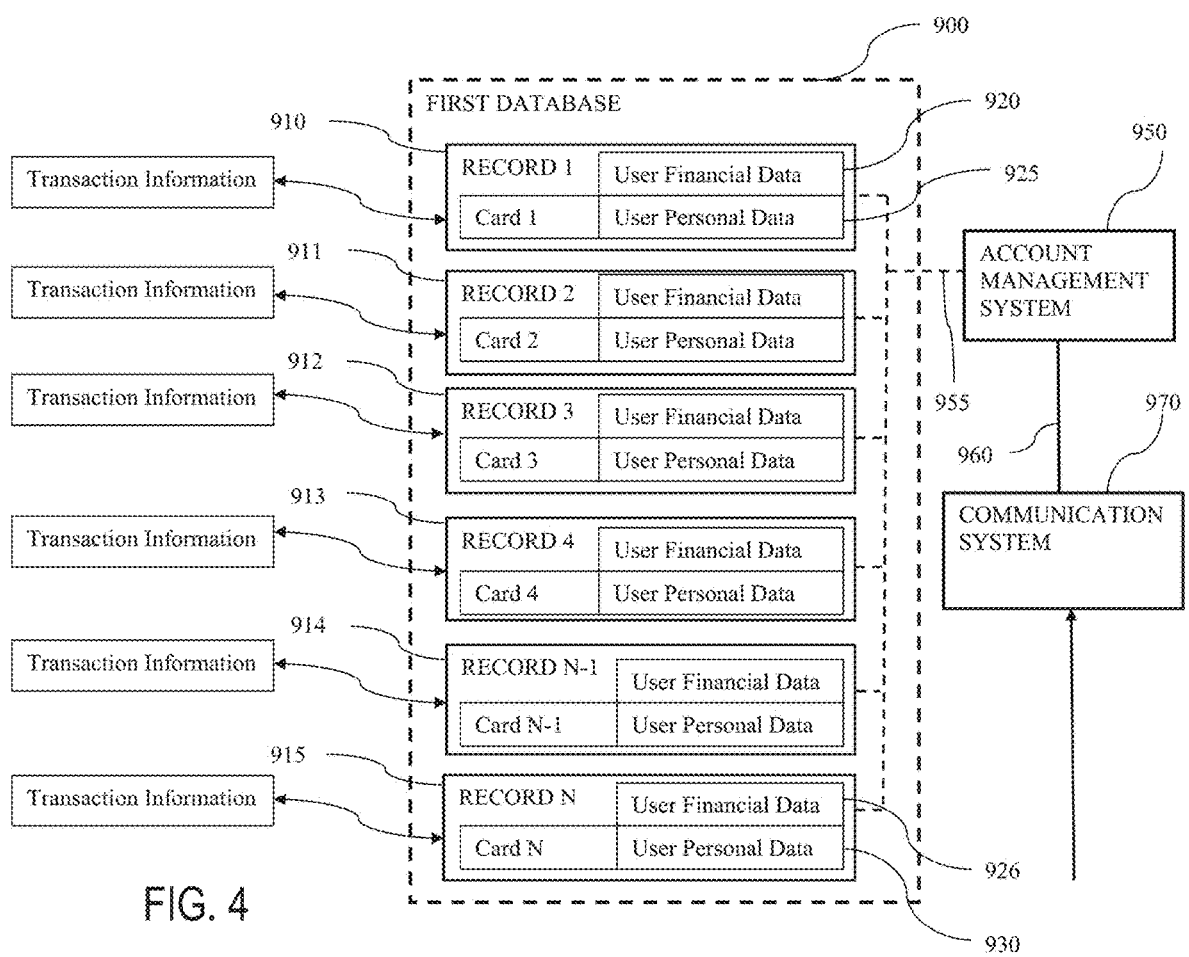
FIG. 4 illustrates an embodiment of a system of dispersed elements comprising a first database, an account management system, and a communication system.

FIG. 4 illustrates an embodiment of a system of dispersed elements comprising a first database, an account management system, and a communication system, where the communication system may be in communication with a user interface (not shown) and/or a merchant interface (not shown).

The first database 900 may be used to store electronic data records 910-915 for one or more users, 1 to N. Each of the one or more data records 910-915 may comprise user financial data 920-925 and user personal data 926-930. The data records may be investment accounts that comprise financial data and personal data. The financial data 920 may comprise one or more values, which may include an investment amount and a first data. The personal data 925 may comprise personal identifying information provided by the user, for example, a full name, address, telephone number, and social security number, and personal identifiers generated by the system, such as an identification code, to uniquely identify a user from all other users. In an embodiment, interrelated financial data and the personal data would be stored in the same database record, and associated with a specific user.

In embodiments of the invention, the account management system 950 may be a separate node located remotely from the first database 900, and in communication with the first database over communication lines 955. The communication lines may be data and/or telecommunication networks including, for example, wired, wireless, and/or satellite networks.

The account management system 950 may comprise a communication system 970, or the communication system 970 may be a separate node located remotely from the account management system, and coupled to the account management system over communication lines. The account management system may be coupled to user interface(s) and merchant interface(s) over communication lines 960 that may be coupled to the communication system. Data may be communicated to and from the account management system over packet-switched networks, for example, the Internet, wide area networks (WANs), metropolitan area networks (MANs), and local area networks (LANs).

Transaction information may be communicated to the account management system 950, and the account management system may be configured to receive the communicated transaction information and store the information in the first database 900.

In embodiments of the invention, the transaction information may be generated by the user of a credit or debit card that is linked to a particular record 910-915 stored in the database. The credit or debit card may be linked to and associated with the particular record by a user's personal information and/or an identification code, which may be generated by the account management system and stored in the record. The identification code may associate user financial data with user personal data, and the credit or debit card. Each transaction would thereby be associated with a specific user and/or electronic database record, and data generated by a transaction utilizing the particular credit or debit card may be used in calculation with values stored in the record, or to modify values previously stored in the record.

The account management system 950 may be configured to communicate with the first database 900, and modify values stored in each of the electronic records (1-N) 910-915. The stored values may be modified by the account management system 950 when transaction information is received and/or when a stored value is updated through a predetermined calculation. For example, the account management system may be configured to calculate an amount of accrued interest at the end of each month, and modify the stored value of funds in the account to reflect the additional interest, or store the newly calculated interest value in a field in the record.

Figure 5:
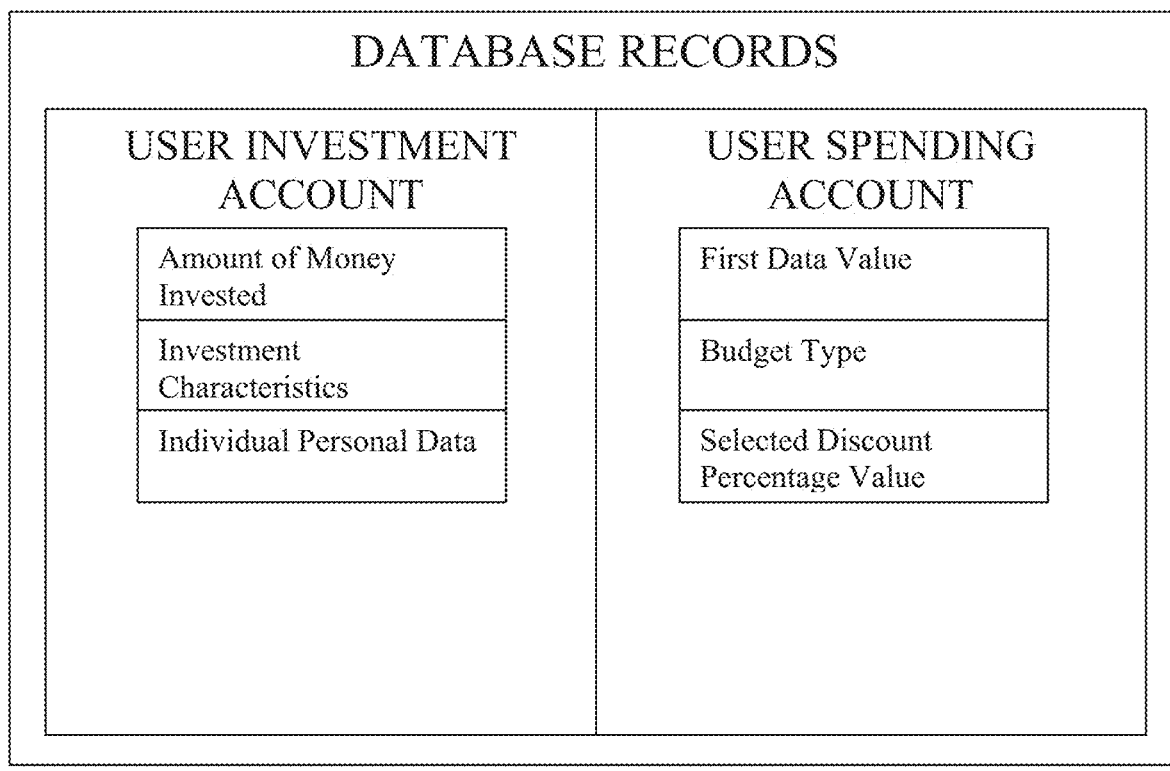
FIG. 5 illustrates an embodiment of a database record containing user account information.

FIG. 5 illustrates an embodiment of a database record containing user account information. The electronic database record stored in a non-transient storage medium may comprise a user investment account and a user spending account, which may comprise financial data. The user investment account may comprise fields for at least an amount of money invested, investment characteristics, and individual personal data. Values for the different investment account characteristics may be stored in the fields of the data record. The values may be modified or new values may be stored in the database record(s) by the account management system. The user spending account may comprise fields for at least a first financial value, a budget type, and a selected savings offer or discount percentage value.

Figure 6:
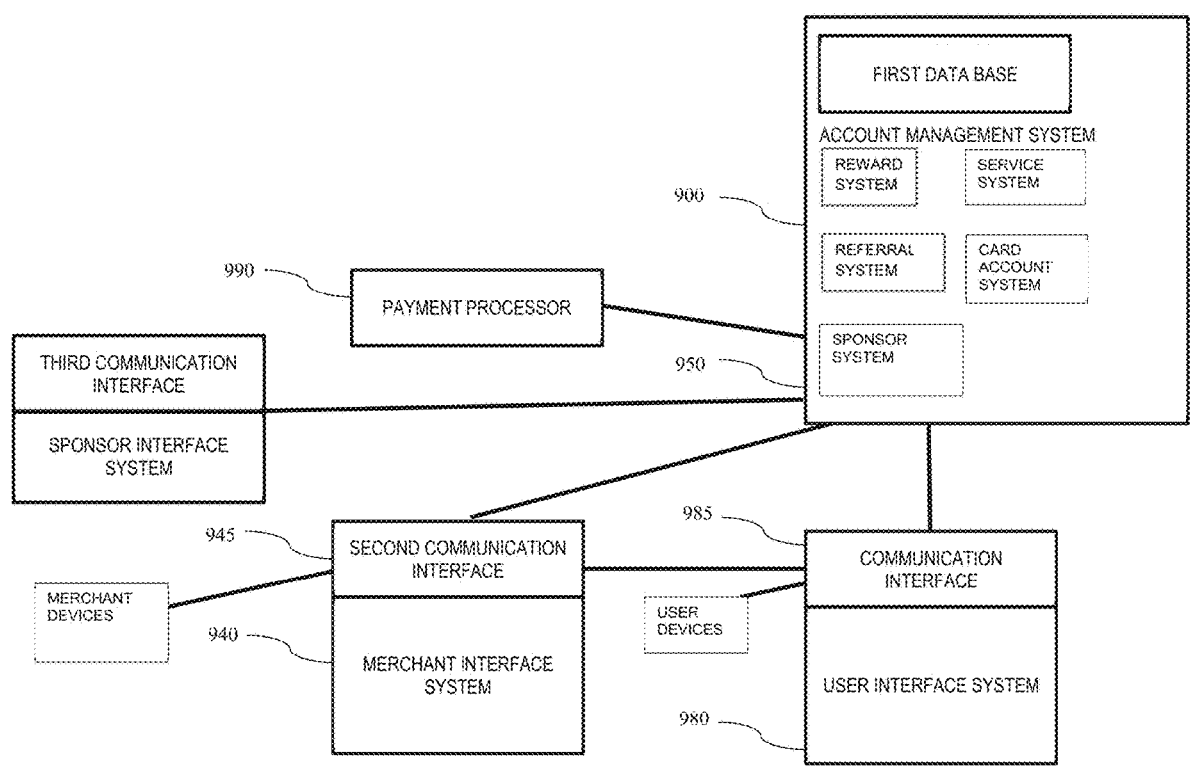
FIG. 6 illustrates a functional block diagram illustrating a computer system configured to be in communication with other remote systems in accordance with one embodiment of the present invention.

FIG. 6 illustrates a functional block diagram illustrating a computer system configured to be in communication with other remote systems in accordance with one embodiment of the present invention. A system comprising various dispersed network elements, including: a first database 900, and account management system 950, a payment processor 990, a first communication interface 985, a user interface system 980, a merchant interface system 940, and a second communication interface 945 are shown. The various elements are shown interconnected by communication lines in a particular manner, however, other arrangements may be used to interconnected the elements and communicatively couple them as would be known in the art. If desired, elements can be co-located or combined within a data center, cloud computer center, server system or other arrangements.

In an embodiment, the first database may be associated with and in communication with the account management system 950 by implementing suitable communication hardware having a sufficient number of communication channels to handle the amount of user and transaction data received by the system. The account management system may also be in communication with a payment processor 990 that may receive notification of a transaction and/or associated transaction data from a merchant, and communicate the transaction data to the account management system 950 for processing and storage.

In an embodiment, the account management system 950 may also be in communication with a user interface 980 through a communication interface 985. The communication between the account management system 950 and the user interface 980 may be through a communication system 970 comprising communication hardware, software, and firmware that can be suitably configured to communicate data between the dispersed network elements. Communication hardware allows the computer system to transmit and receive data over communication lines connected to one or more networks, which may be for example, the Internet, LAN, WAN, and MAN networks, telecommunication networks, satellite networks, and/or wireless networks. Communication hardware may handle the packetizing or depacketizing of data and handle protocol requirements necessary for transmitting and receiving packets. Communication hardware can transmit or receive data or information to or from the various elements of the computer system.

A merchant interface system 940 may also be in communication with user interface 980 through a second communication interface 945 comprising communication hardware, software, and firmware that can be suitably configured to communicate data between the dispersed network elements.

Merchant interface system 940, user interface system 980, and/or sponsor interface system can be integrated into account management system 900 (e.g., as subcomponents within a system or interconnected as part of a network that implements the account management system). If desired, merchant interface system 940, user interface system 980, and/or sponsor interface system communicate with each other through account management system 900 by first interacting through communications with account management system 900. Account management system 900 can receive and generate new communications or relay communications to corresponding systems. In such examples, the communications interface can be integrated into one or more subsystems for carrying out communications functionality and relevant interface operations. Merchant, user, or sponsor devices are devices such as smartphones, mobile devices, personal computers. With such devices, end users can interact with merchant interface system 940, user interface system 980, and sponsor interface system. Account management system 900 can also include a communications interface provides users with the opportunity to interact, view, and manage financial accounts at account management system 900.

Account management system may include a referral systems, reward system, sponsor system, card account system, and/or service system (e.g., a system that implements the savings or discount service or program). If desired, one more of the systems can be external and connected to the system through a communications network. Examples of implementations of these systems are illustratively described herein.

Figure 7:
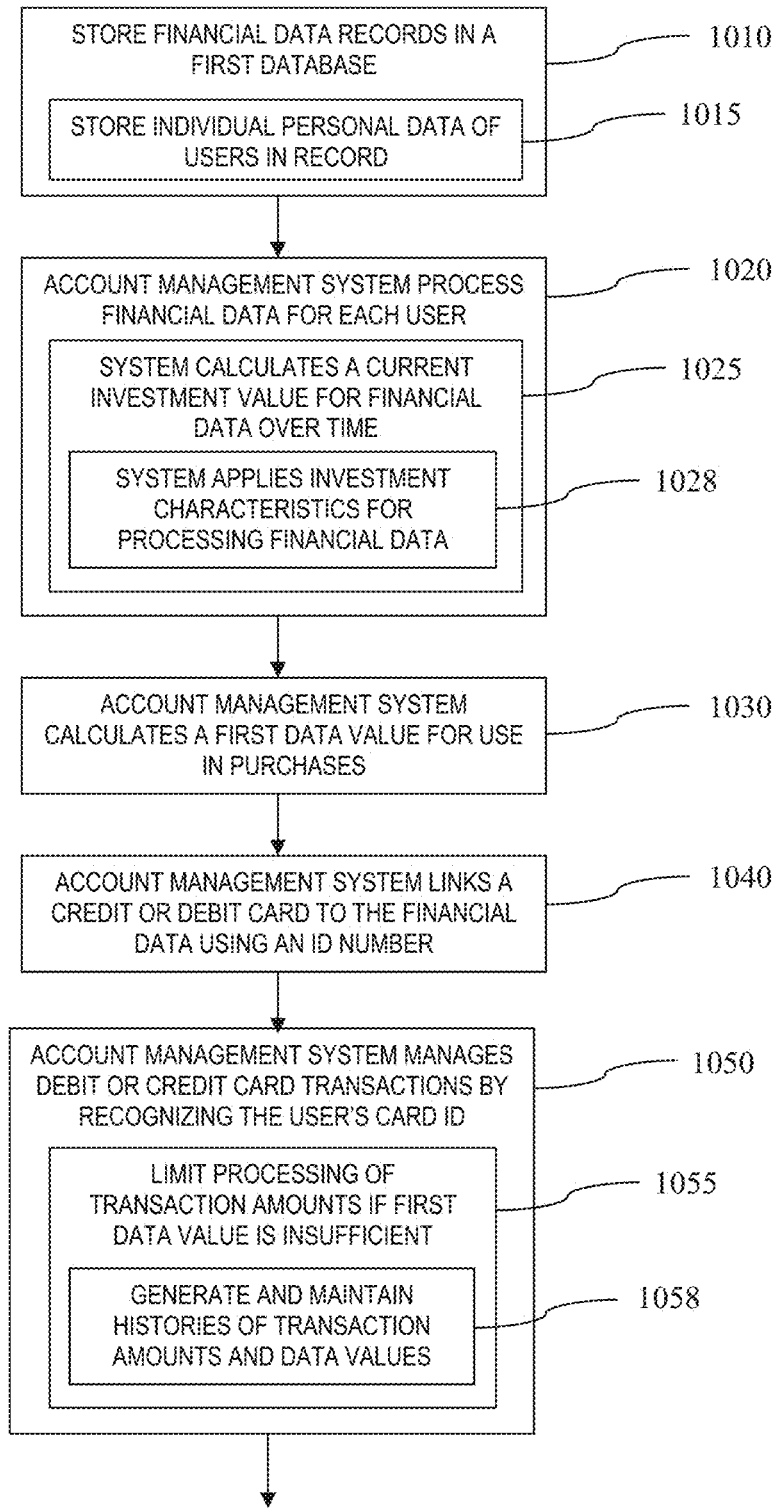
FIG. 7 illustrates another embodiment of the invention relating to the processing of data by the account management system.

FIG. 7 illustrates another embodiment of the invention relating to the processing of data by the account management system in which financial data records are stored in the first database, as shown in step 1010, and individual personal data may also be stored in the data records, as shown in step 1015. The financial data record therefore also comprises individual personal data. The account management system is configured to process the financial data for each user that has an associated record stored in the database, as shown in step 1020. The account management system may process the data to calculate a current investment value for the stored financial data over time, as shown in step 1025. The system may apply investment characteristics that may be applied to process the stored financial values, and calculate new values, as shown in step 1028. The investment characteristics may provide information relating to how the financial values are intended to change over time, for example, by an interest rate.

In this embodiment, the account management system may also be configured to specify a first data value as a function of the financial data, as shown in step 1030. The first data value may be an amount committed to be used in purchases with one or more designated merchants. The first data value can also be an account balance or available financial resource for spending. The amount specified for the first data value may be calculated as a portion of an invested amount or as a function of other financial data values, such as the interest rate applied to the investment.

The account management system may link a credit or debit card to the first data value, as shown in step 1040. The credit or debit card may be an existing card held by the user, which was issued by an unrelated third-party financial institution, or the credit or debit card may be newly issued by the financial institution implementing the system described herein (e.g., the system that implements the merchant matching and/or financial account systems). The card may be linked to the financial data by associating an identification number with both the card and the financial data record of the user. In one embodiment, a financial account is opened and a principal investment amount is deposited in the financial account by a user, and in addition, a financial transaction card is issued to the customer as part of opening the account.

The account management system may manage the transactions involving the user's debit or credit card, as shown in step 1050, by recognizing a transaction has been conducted using a particular card, and processing the first data value associated with the card. If desired, the account management system may limit processing of transaction amounts based on the first data value (and/or related credit protections or additional resources), as shown in step 1055. For example, if the first data value is less than a transaction amount, the account processing system may refuse to acknowledge the transaction and/or notify the payment processor handling the transaction of an insufficient amount of funds. The account management system may instead transmit the first data value to a payment processor to limit the amount of the transaction to the amount of funds available.

The account management system may generate and maintain records of the first data value and or transaction amounts, as shown in step 1058, in order to maintain a transaction history and/or a historic record of first data values, which may be used for reporting purposes, to reconcile disputes, or to reconstruct a value that was lost or corrupted.

In order to implement an embodiment of a system that can synchronize a debit/credit card with a spending account, where the hardware and software may be spread out geographically and dispersed over multiple computer systems, a number of problems may be encountered, and the system preferably should be configured at least to:
1. create one or more unique record(s) for each account;
2. confirm that a record exists on the system for each specific account and duplicate records for the same account are avoided;
3. receive data for the volume of transactions anticipated to be engaged in by the customers;
4. confirm the identity of the party engaging in the transaction for security and record keeping;
5. apply the correct calculations for determining the available amount of funds and eligible amount of a reward at the time of the transaction;
6. coordinate storage of account and credit/debit data in each associated record, which may be distributed over a dispersed system;
7. record the changes to account balances, eligible reward amounts, and user profiles, so the information is updated before a subsequent transaction may occur;
8. reconcile discrepancies in transaction and account records distributed over hardware and software platforms;
9. confirm that the correct data is stored for each account and user; and
10. provide sufficient storage and back-ups to guarantee record integrity in case of hardware failures or data corruption.

Figure 8:
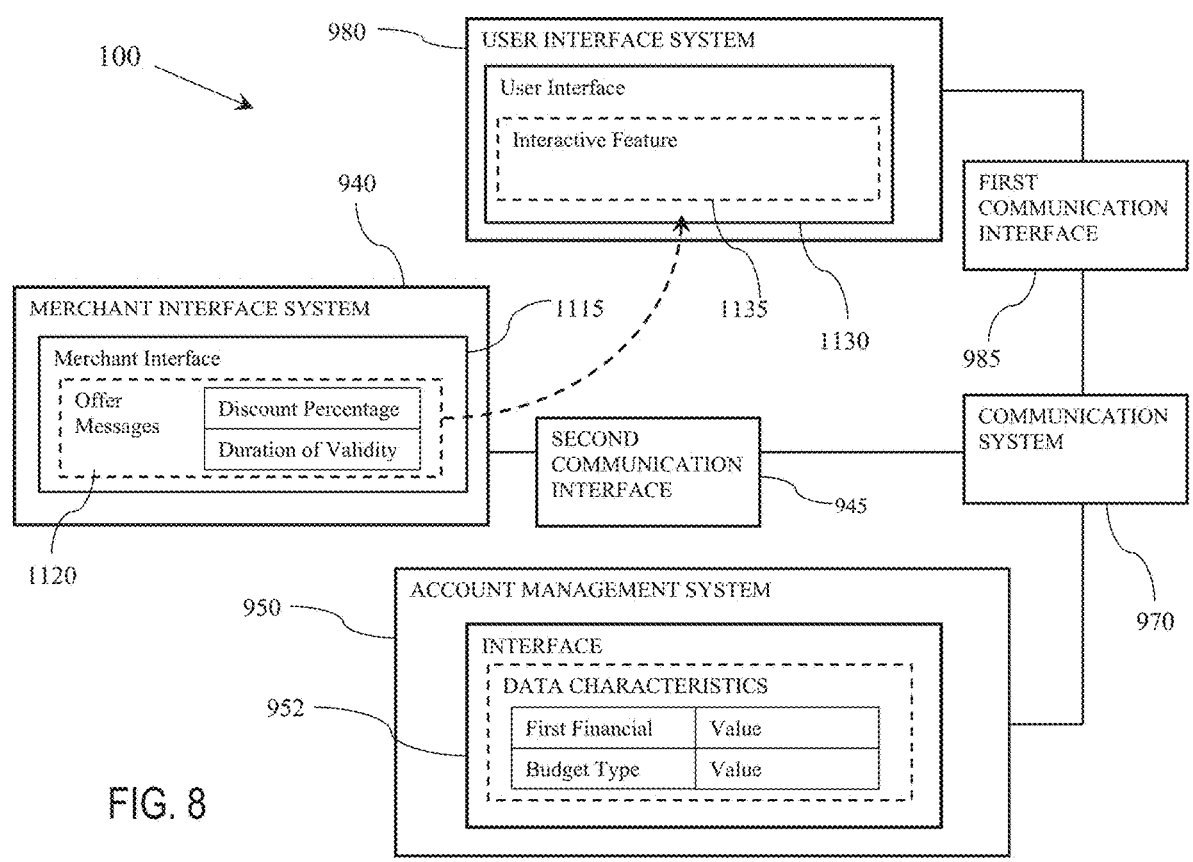
FIG. 8 illustrates a block diagram showing an embodiment of the system implementing a merchant interface system.

A high-level functional diagram for implementing features of systems and methods for providing such services or products is provided in FIG. 8.

FIG. 8 illustrates a block diagram showing an embodiment of the system 100 implementing a merchant interface system 940 comprising a merchant interface 1115, and an offer message 1120 generated at the merchant interface system. The offer message may comprise offer characteristics including a savings or discount percentage and a duration for which the savings or discount would be active. In an embodiment, the merchant interface system communicates an offer message to a user interface system 980 comprising a user interface 1130 having an interactive feature 1135 that may be manipulated by a user. The offer message 1120 may be communicated through the system 100 or directly to the user interface system 980 through a network. The user interface system, merchant interface system, database, and/or account management system may be interconnected and in communication through a communication system 970 that provides hardware, software, and firmware to manage the transfer of data between each of the elements. The user may interact with the interactive feature to select from one or more offer messages 1120 communicated from one or more merchants.

The merchant interface system 940 may also be in communication with the account management system 950 through the second communication interface 945. The merchant interface system may transmit criteria to the account management system to identify a pool of users having similar personal characteristics, and the account management system may transmit data characteristics to the merchant interface system for the merchant user to determine characteristics of the offer message 1120.

The account management system 950 may be in communication with the user interface system to receive indications of the offers selected by a user from the one or more merchant offers, and record the user's selection(s). The account management system 950 may have an interface 952 to allow manipulation of financial data, personal data, and data characteristics.

If desired, in some embodiments, the system can be implemented that provides the individual users with the opportunity to select to join the system and to select to link which ones of their personal accounts, e.g., checking accounts, to be linked to the system. The individual users can then select budget types and budgets for respective types and in response merchant offers as illustratively described above. In this example, the consumers can essentially self select investment accounts or checking accounts that will be part of the system and will be linked to the designated card for transaction. This example can also result in self selection of a credit or debit card that is tied for transaction with an existing account and the system can then ride as an add-on over an existing system. The system can be configured to provide its features to this type and other types of consumers.

The system can be configured to display to the consumer and merchants the progress in their individual capture budgets and offers over time.

It should be appreciated that the use of the term "system" used throughout, may refer to an associated software system, hardware system, or a combination of both software and hardware, such as a processor and related software (stored on transient and/or non-transient memory) for carrying out the programmed applications described herein. It should also be appreciated that the various systems described herein may each have dedicated software and hardware (e.g., a dedicated server running associated software for each system, a processor and related supporting circuitry, etc.) or, alternatively, may be distributed and/or share hardware and/or software with other systems. The various systems of the present invention may also be implemented on virtual servers as part of a more generalized computer system.

Figure 9:
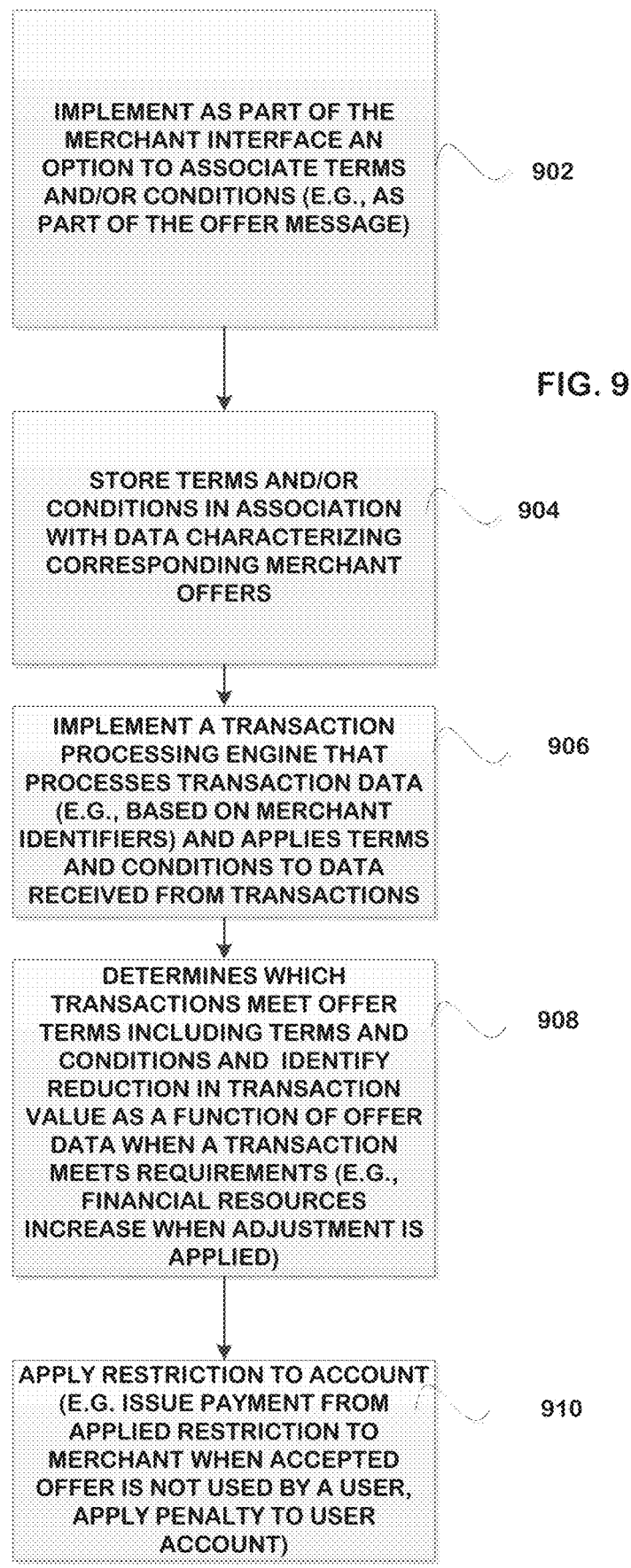
FIG. 9 illustrates an embodiment of the components and processes of a merchant interface system allowing a merchant to set forth terms and conditions for partaking of an accepted merchant offer.

FIG. 9 illustrates an embodiment of the components and processes of a merchant interface system allowing a merchant to set forth terms and conditions for partaking of an accepted merchant offer. At step 902, a merchant interface is implemented. In addition to the options and features described above, the merchant interface allows the merchant to set terms and conditions for one or more offers it intends to offer a user or a group of users, and includes these terms and conditions in any merchant offer messages communicated to the account management system. The terms and conditions may include, for example, a maximum amount of savings or discount allotted for a particular timeframe, exempting certain products or categories of products from the applicable savings or discount, or any other rules or conditions. The terms and conditions may also set forth a termination or rescission right that would allow the merchant to revoke the discount or savings offer in the event the user abuses or otherwise violates the terms and conditions of the offer.

As shown in step 904, the account management system stores the terms and conditions and associates them with the merchant offer(s) represented by the merchant offer message. Thereafter, as shown in step 906, the transaction engine of the account management system processes user transactions involving the merchant in accordance with the merchant's terms and conditions. That is, as shown in step 908, the account management system determines which transactions meet the merchant offer terms and conditions and, if so, identifies the applicable discount or savings to be credited to the user's account. In the event that a user's transactions violate the terms and conditions of the offer, or any other restriction placed on the user's right to receive the discount or savings from the merchant, the account management system may enforce the terms and conditions, for example, by imposing a monetary penalty (or breakage fee, default fee, or revoking of rewards points), as shown in step 910.

Figure 10:
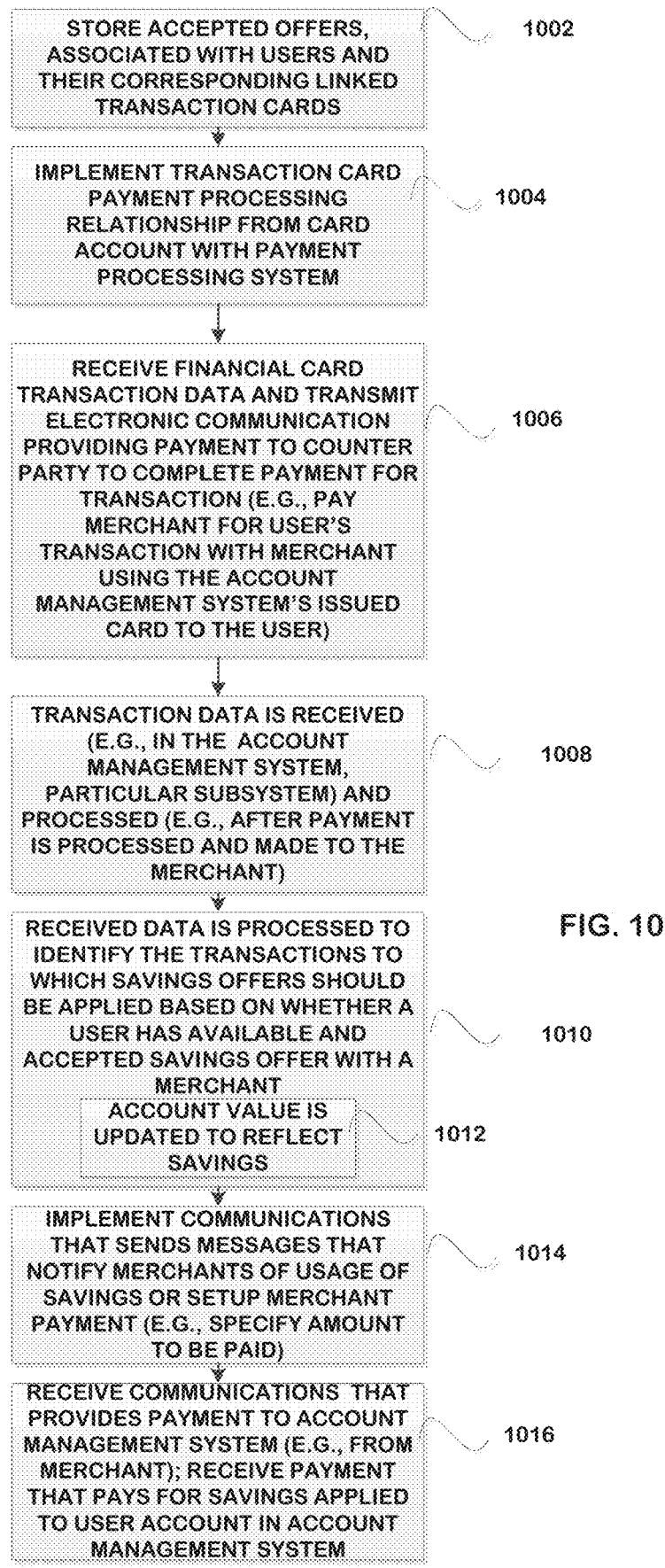
FIG. 10 illustrates an embodiment of the components and processes of an account management system.

FIG. 10 illustrates an embodiment of the components and processes of an account management system. Similar to the account management systems described above, the account management system of this embodiment processes transactions in accordance with a savings or discount offer provided by a merchant. At step 1002, an accepted offer is stored and associated with the user's account, as well as with any financial transaction cards that may be linked with the account. As shown in step 1004, a transaction card payment processing relationship is set up between the transaction card and the user's account, such that the transaction card becomes authorized to engage in purchases and use a pledged amount in transactions involving accepted offers. As shown in step 1006, when a user purchases products at the merchant using the financial transaction card, financial transaction data is transmitted from the merchant to the account management system, which then electronically communicates full payment to the merchant (or counter party) for the user's purchase. As shown in step 1008, the account management system, or a subsystem thereof, then processes the transaction data, e.g., after payment is made to the merchant. As part of this process, the account management system identifies whether the transaction is associated with a savings or discount offer provided by the merchant and accepted by the user, as shown in step 1010. If so, the account management system, as shown in step 1012, updates the user's account by applying the appropriate savings or discount to the user's account, for example, by crediting the user's account with an amount equal to the savings or discount. As shown in step 1014, after the appropriate amount is credited, the account management system communicates an electronic message to the merchant indicating that the savings or discount has been applied to the user's account, and requesting payment for reimbursement. The merchant then communicates payment to the account management system to reimburse for the applied savings or discount, as shown in step 1016.

Figure 11:
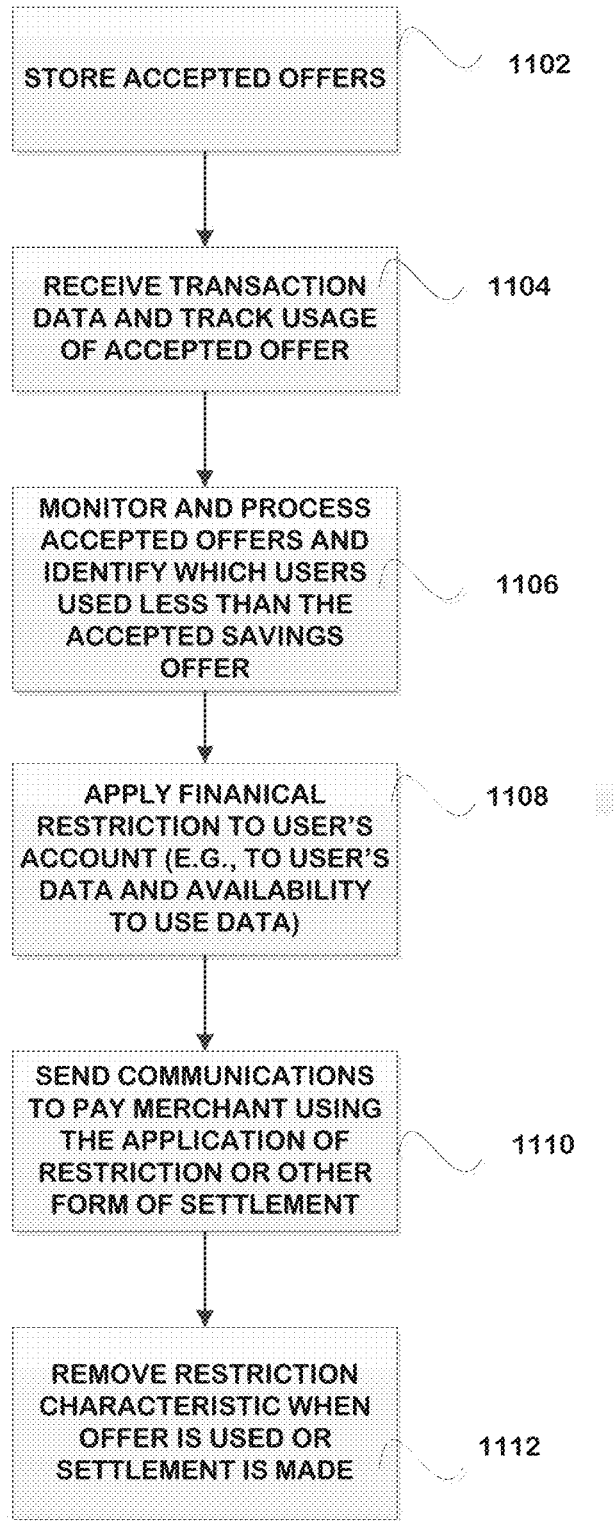
FIG. 11 illustrates another embodiment of the components and processes of an account management system enforcing merchant restrictions of an offer.

FIG. 11 illustrates another embodiment of the components and processes of an account management system enforcing merchant restrictions of an offer. Similar to the account management systems described above, a user is given the option to accept various offers made available by merchants in accordance with certain criteria, such as a pledge amount and budget type. If the user accepts a merchant's offer, the account management system stores the offer, including its terms and conditions, as shown in step 1102. The user then makes purchases at the merchant's place of business using a financial transaction card associated with his/her account. When the user makes the purchases, transaction data is communicated from the merchant to the account management system, as shown in step 1104. The account management system monitors and processes accepted offers, and identifies which users used less than the accepted savings or discount offer, as shown in step 1106. At step 1108, in response to determining that the user did not use their accepted offer, the system enforces the mutually-agreed interaction by using a restriction that was attached to the user's financial information as part of the establishing the user-merchant electronic relationship with respect to the accepted offer. For example, a restriction could have been that a portion of a certain investment account is collateral and is electronically tagged to be used in the event the user does not use the offer. A restriction was earlier implemented and applied to account data and when there is a default, the system can preferably automatically use the value in that account, under management by the account system, to pay the merchant for the user breaking the mutually-agreed interaction (e.g., transmit a payment that corresponds or matches payments or profits that the merchant would have otherwise made if the user had not broken the agreement). If a use of an applied restriction is invoked, the account management system may take action to limit the user's account, such as, for example, by limiting the user's availability to funds in an account that was used as collateral. Or another form of restriction can be exercised that will be correspond and satisfy the user's agreed commitment level to the accepted offer. At step 1110, payment is communicated to the merchant from the use of the restriction to withdraw funds from the user. Once the offer expires, or otherwise becomes inactive, such as, for example, if a available savings or discount (discount percentage over a specified duration) is used, the restriction characteristic(s) placed on the user's financial data are removed, as shown in step 1112.

Figure 12:
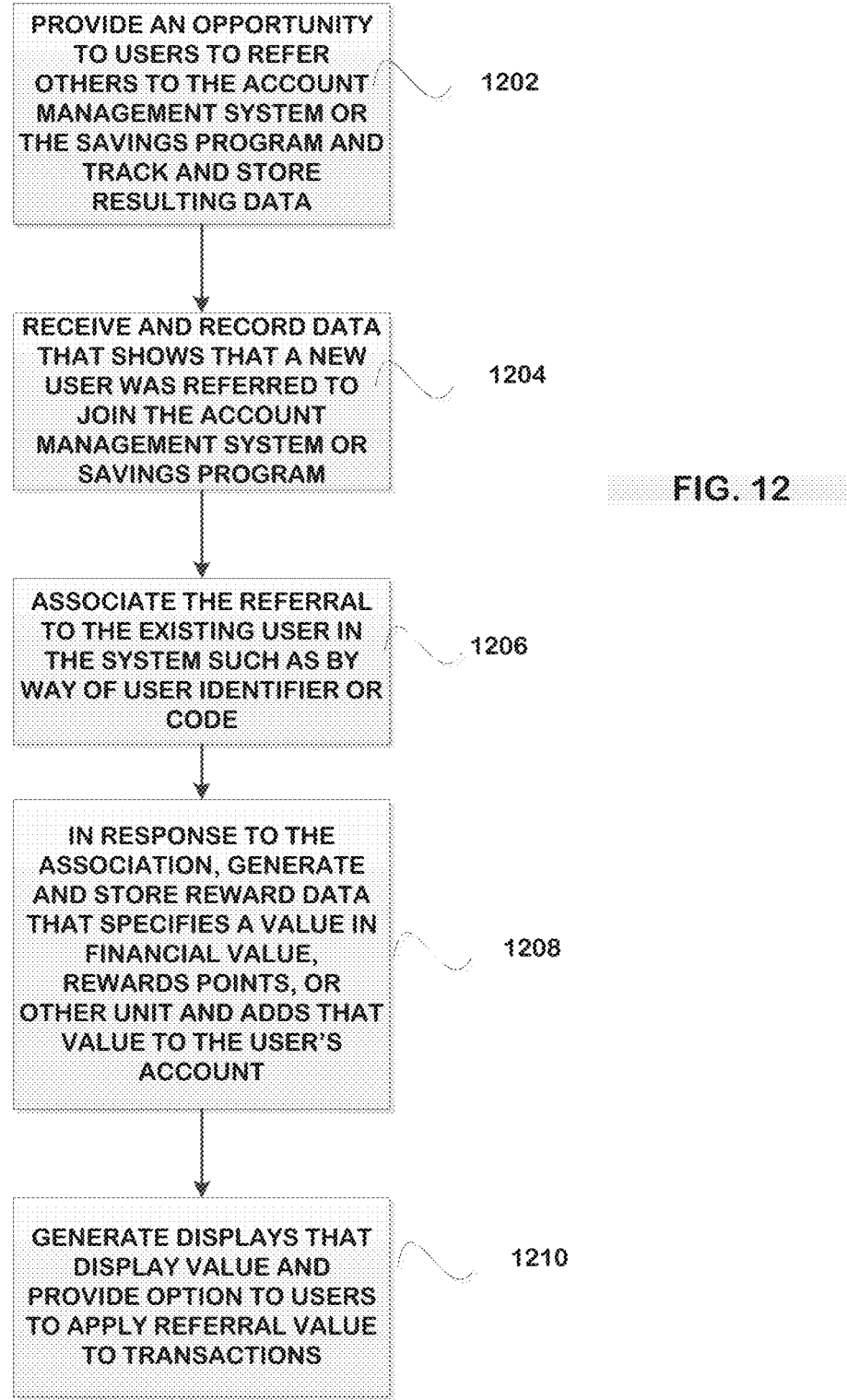
FIG. 12 illustrates another embodiment of the components and processes of an account management system, including a referral system for rewarding users' referral of business.

FIG. 12 illustrates another embodiment of the components and processes of an account management system, including a referral system for rewarding users' referral of business. In this embodiment, users are provided the opportunity to refer other users to the financial institution implementing the account management system, and to be rewarded for such referrals, as shown in step 1202. For this purpose, the account management system provides a mechanism (e.g., by way of the user interface system) by which a user can refer another user to the account management system, as shown in step 1204. Once the account management system receives the referral, the referral is stored and associated with the user making the referral, as shown in step 1206. The account management system then generates and applies a reward to the user's account, as shown in step 1208. The reward may be, for example, a monetary reward, reward points, or any other unit or indicia adding value to the user's account. The reward may also be made conditional on the referred user becoming a member of the financial institution and/or setting up an account therewith. Once the reward is stored and applied to the user's account, the account management system notifies the user and provides him/her with the option of applying the reward toward future merchant transactions, as shown in step 1210.

Figure 13:
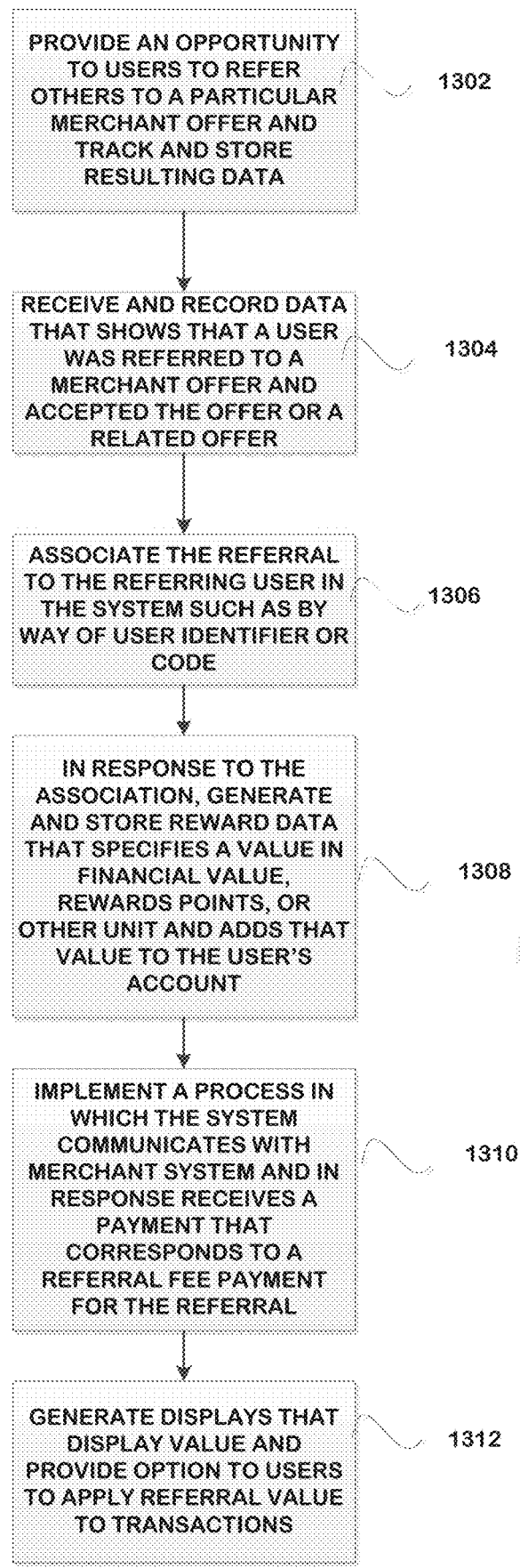
FIG. 13 illustrates another embodiment of the components and processes of an account management system, including a referral system for rewarding users' referrals of merchant offers to other users of the system.

FIG. 13 illustrates another embodiment of the components and processes of an account management system, including a referral system for rewarding users' referrals of merchant offers to other users of the system. In this embodiment, users are provided the opportunity to refer merchant offers to other users of the account management system, and to be rewarded for such referrals, as shown in step 1302. For this purpose, the account management system provides a mechanism (e.g., by way of the user interface system) by which a user can refer a merchant offer to another user, as shown in step 1304. As shown in step 1306, if the other user accepts the offer, the referral is associated with the referring user, for example, using an identifier or code. As shown in step 1308, the account management system credits the referring user's account with a reward, which may be, for example, a monetary reward, reward points, or any other unit or indicia adding value to the user's account. The amount of the reward may be established directly by the merchant that made the offer (e.g., via the merchant interface system), or by the financial institution implementing the account management system. Either way, the account management system sends an electronic communication to the merchant requesting reimbursement for the reward, as shown in step 1310. Once the reward is stored and applied to the user's account (and paid for by the merchants), the account management system notifies the user and provides him/her with the option of applying the referral value towards future merchant transactions, as shown in step 1312. In this way, a merchant may utilize the account management system to solicit and/or otherwise increase business flow to its place of business.

Figure 14:
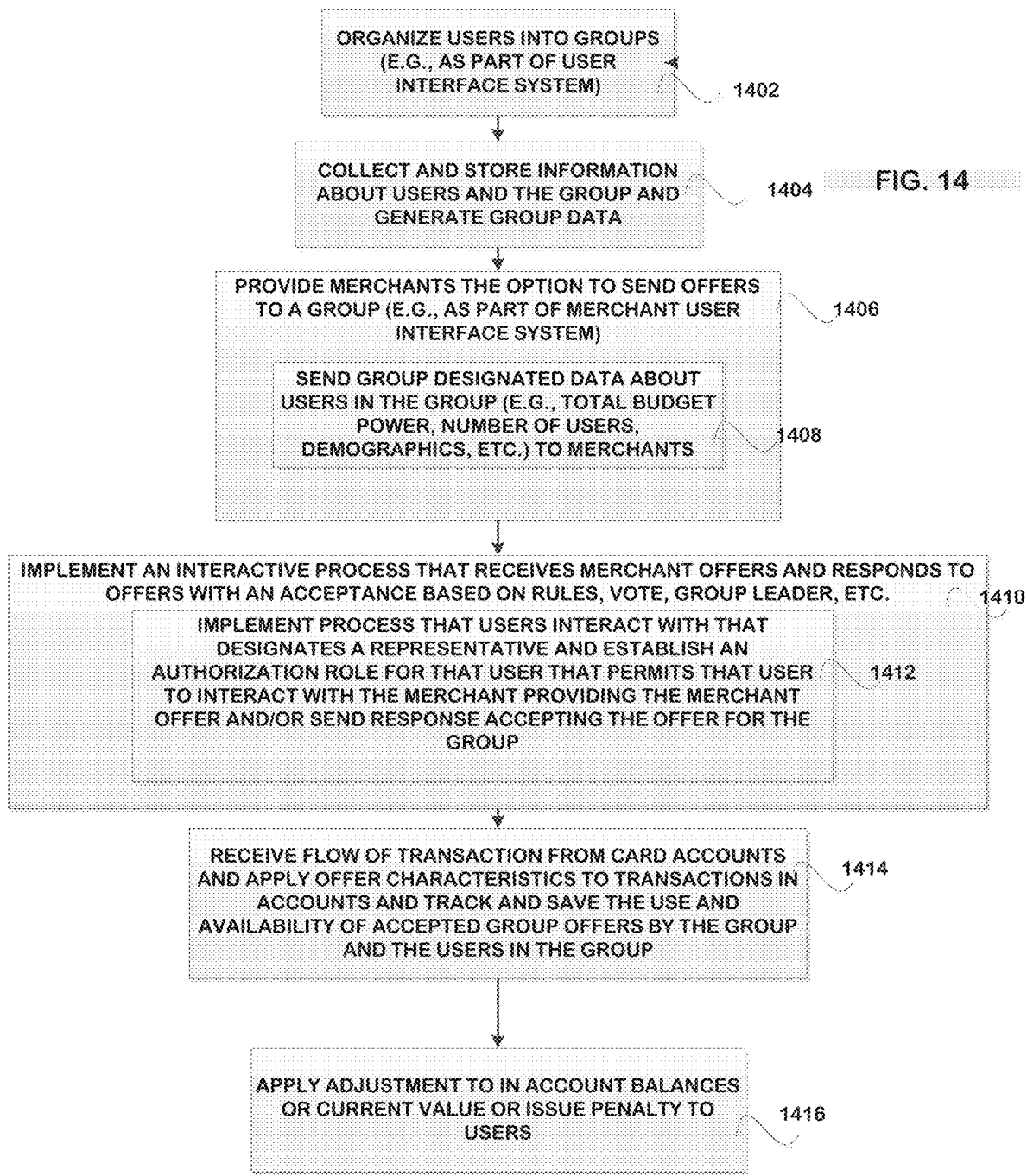
FIG. 14 illustrates another embodiment of the components and processes of an account management system, in which user groups (or sponsors) participate.

FIG. 14 illustrates another embodiment of the components and processes of an account management system, in which user groups (or sponsors) participate. In this embodiment, users of the account management system are given the option of forming groups, which may act collectively on merchant offers. Alternatively, a sponsor may be given the opportunity to form a group on behalf of its members, and to apply certain merchant offers to users who are also affiliated with the sponsor. For example, the Veterans Association of America may enroll as a sponsor with the account management system, and commit to a large pledge on behalf of its members.

As shown in step 1402, users form such groups via appropriate interface options provided by the user interface system, which forwards the group request to the account management system. As shown in step 1404, once the account management system receives an indication from all group users that a group is to be formed, the account management system forms the group by storing information about the users and associating them into a group, such as, for example, via a group identifier. If a sponsor forms the group, any users of the account management system who are also members of the sponsor, are associated into a group.

From the perspective of the account management system, the group may take on the characteristics of a single user, having the ability to designate a group pledge, budget type, personal information, etc. Once the group is formed, the account management system sends an electronic communication to participating merchants informing them of the group or sponsorship, and providing them with the ability (i.e., via the merchant interface system) to send offers (e.g., to the group), as shown in step 1406. The account management system may also communicate group designated information to the merchant. This information may include, for example, personal and financial information of the group as a whole (e.g., group pledge, budget type, number of users, demographics of users, etc.), as shown in step 1408. If the merchant sends an offer to the group, the account management system implements an active process that responds to the offer based on group designated rules (or sponsor designated rules), as shown in step 1410. For example, individuals of the group may vote on whether to accept or reject a particular offer, or the group may designate a representative user with full authority to accept offers and act on behalf of the group, as shown in step 1412. If the group is sponsor formed, it is contemplated that the sponsor would retain all rights and authority to respond to offers, and may sell or otherwise transfer the right to the savings or discount offer to another entity or individual.

After the offer is accepted, the members of the group may utilize their associated financial transaction cards to make purchases at the merchant's place of business. The account management system receives transaction data from these purchases, and applies the savings or discount offer to the accounts of the group users in accordance with the terms and conditions of the offer, as shown in step 1414. The savings or discount may be applied, for example, proportionally in accordance with the number of users in the group, or proportionally in accordance with an amount of spending of the users. The account management system enforces any terms, conditions and/or restrictions of the offer, with any default or violation acting to the detriment of the group as a whole (or the sponsor, as the case may be). Once the savings or discounts are applied, the accounts of the group members are updated accordingly, as shown in step 1416.

Figure 15:
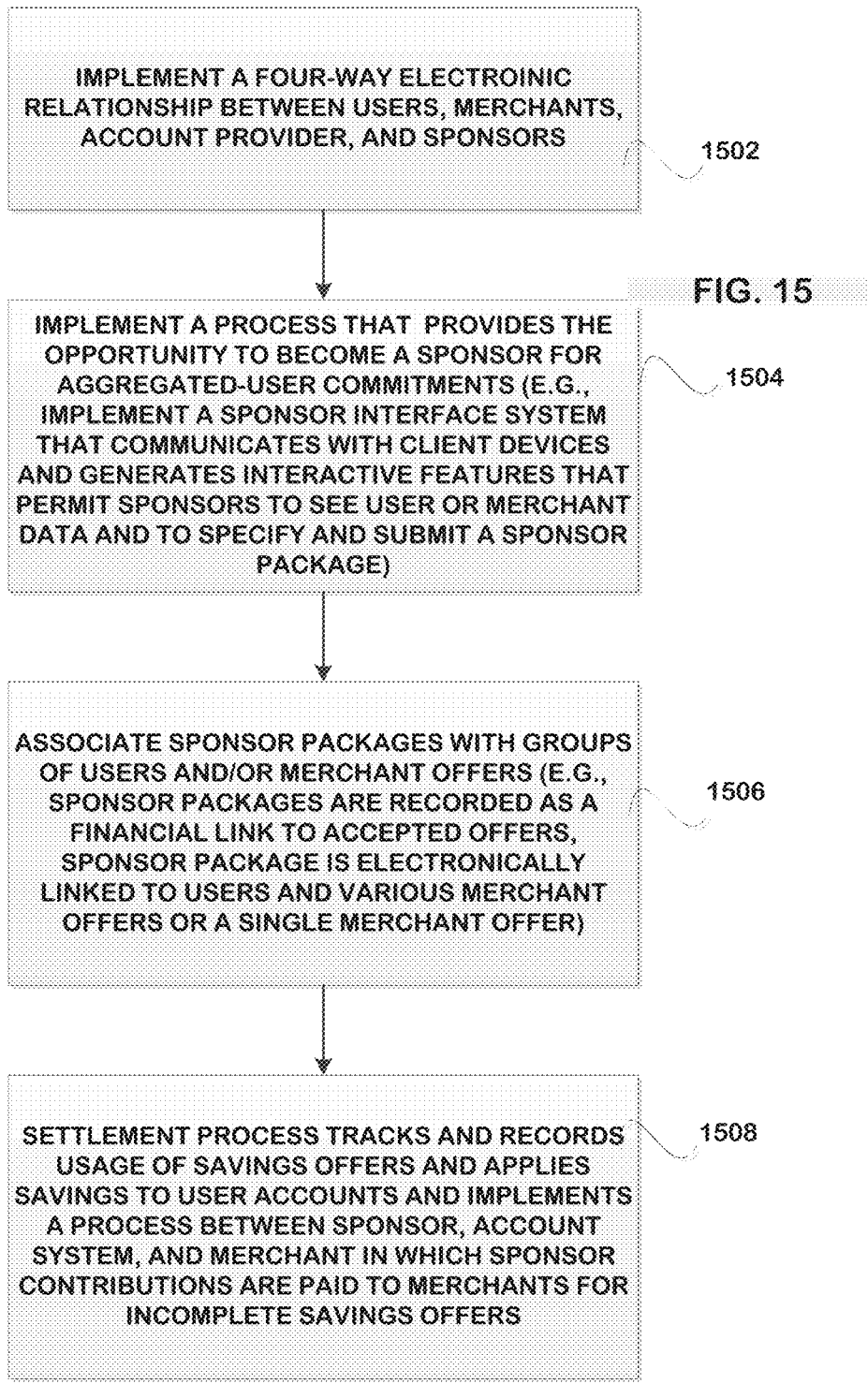
FIG. 15 illustrates another embodiment of the components and processes of an account management system, in which sponsors participate.

FIG. 15 illustrates another embodiment of the components and processes of an account management system, in which sponsors participate. At step 1502, the account management system sets up a four-way electronic relationship between users and merchants of the account management system, as well as any associated account providers and a participating sponsor. The account management system provides a mechanism by which a sponsor is given the opportunity to become a member of the account management system (or associated account provider) and provide an aggregated pledge commitment on behalf of members or affiliates of the sponsor, as shown in step 1504. For this purpose, the account management system is implemented to include a sponsor interface system that permits a sponsor to interface with the account management system. The sponsor interface system causes a sponsor interface to be presented to the sponsor (or representative of the sponsor) on one or more sponsor devices, such as, for example, a personal computer, smartphone, or tablet. The sponsor interface system may present the sponsor interface, for example, using an Internet browser application or, alternatively, via a software program (e.g., an "app") resident on the sponsor device. The sponsor interface may provide access to the financial records of the sponsor or one or more user(s) associated with sponsor, where the financial records may comprise financial data and sponsor data of the sponsor or associated users. As shown in step 1504, the sponsor interface may also provide the ability for sponsors to view user or merchant data and/or to submit a "sponsor package," which may consist of a sponsor pledge and one or more budge type categories. The sponsor package may be associated with a certain select group of users (e.g., users of the account management system who are also members of the sponsor organization) and/or merchant offers via a financial link or some other form of identifier, as shown in step 1506. The sponsor may use the system to transmit information specifying and accepting a sponsorship relationship before a group or members of a group are identified.

If a particular merchant offer associated with a sponsor package is accepted, the associated users may utilize their financial transaction cards to make purchases at the merchant's place of business. The account management system receives transaction data from these purchases, and applies the applicable savings or discount to the sponsor's account (or to the accounts of the associated users) in accordance with the terms and conditions of the offer. The account management system enforces any terms, conditions and/or restrictions of the offer, with any default or violation acting to the detriment of the sponsor, as shown in step 1508.

Figure 16:
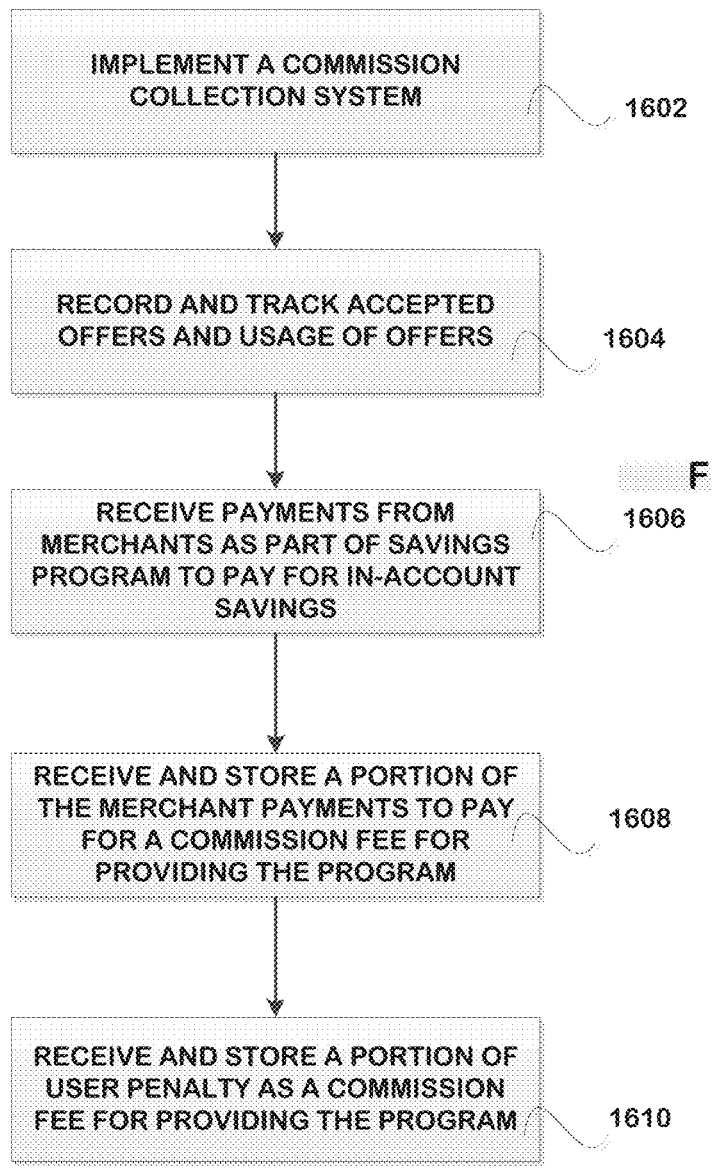
FIG. 16 illustrates another embodiment of the components and processes of an account management system, in which an account provider or other entity employing the account management system may receive a fee or commission for providing a discount program.

FIG. 16 illustrates another embodiment of the components and processes of an account management system, in which an account provider or other entity employing the account management system may receive a fee or commission for providing a discount program, as shown in step 1602. Similar to the account management systems described above, the account management system of this embodiment processes transactions in accordance with a savings or discount offer provided by a merchant and accepted by a user, as shown in step 1604. In this embodiment, however, only a portion of the merchant's offer is made available to the user. For example, in a situation where a merchant offers a user a 20% discount, the account management system would communicate a lesser amount of the offer to the user (e.g., 18%). Alternatively, the account management system may pass the entire savings or discount to the user, with a fee being charged directly to the merchant, as more fully described below.

When the user purchases products or services at the merchant, transaction data is transmitted from the transaction with the merchant to the account management system. As part of the transaction, the account management system electronically communicates full payment (e.g., to the merchant) for the user's purchase. Typically, the payment to the merchant is reduced by the credit card transaction fee charged by companies such Visa and Mastercard. The account management system, or a subsystem thereof, then processes the transaction data, e.g., after payment is made to the merchant. After the appropriate amount is credited to the user's account (e.g., 18% discount in the example above), the account management system communicates an electronic message to the merchant requesting reimbursement of the full savings or discount (e.g., 20% in the example above) under the accepted terms of the offer. The merchant then communicates payment to the account management system in accordance with the savings or discount offer, as shown in step 1606. The account management system then credits the user's account with the lesser discount amount (e.g., 18% discount in the example above), keeping the remaining amount (e.g., 2% in the example above) as a fee or commission, as shown in step 1608. The discount can be applied in the account using the designed savings or discount irrespective of the percentage or amount of the credit card transaction fee.

Alternatively, the entire amount of the offer may be passed to the user, with the fee being collected directly from the merchant as a cost of participating in the discount program. As shown in step 1610, the account provider or other entity employing the account management system may also keep as a commission a portion of any penalties that would otherwise be paid by the user to the merchant for violating terms, conditions, or restrictions of the offer.

Figure 17:
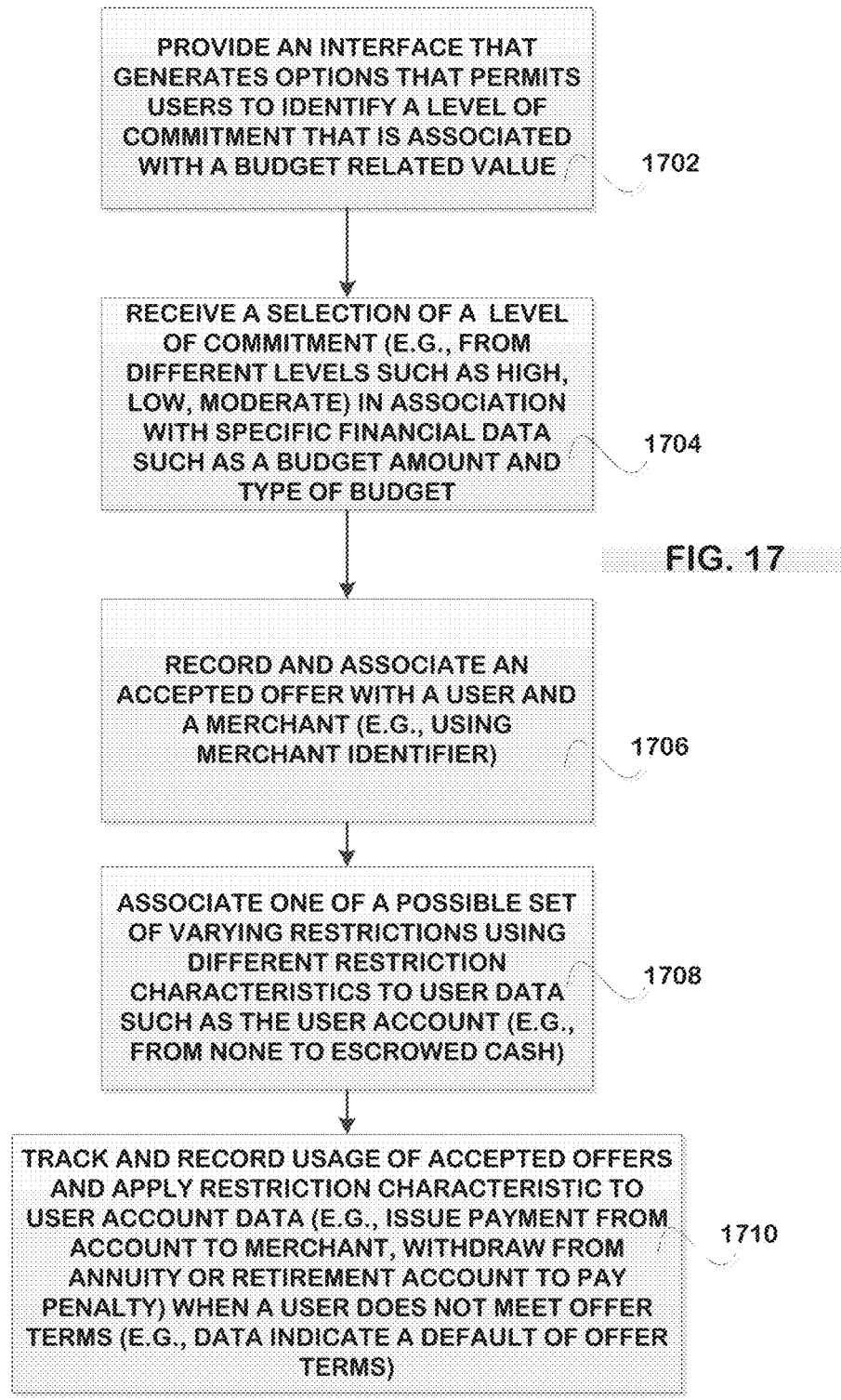
FIG. 17 illustrates another embodiment of the components and processes of an account management system, in which a user may associate a pledged amount or commitment to budget categories.

FIG. 17 illustrates another embodiment of the components and processes of an account management system, in which a user may associate a pledged amount or commitment to budget categories. The system can be implemented to provide interactive options that permit a user to select a level of commitment such as low, medium, or high commitment levels. Each level would correspond to a different restriction or set of restrictions that are applied to the financial data of the user (e.g., to data and systems that control the management of a user's financial account or holdings). This can give the user the flexibility to decide the seriousness of their desire to receive offers and participate in the mutual financial exchanges. At step 1702, a user is provided an interface that generates options permitting the user to identify a level of commitment associated with a particular budget. The options may be provided via a special interface or, alternatively, may be provided via the user interface system and associated user interface. At step 1704, the user communicates to the account management system a commitment level (e.g., low, medium or high) in association with specific financial data, such as a budget amount and budget type. Once an offer is provided by a merchant and accepted by the user, the account management system records and associates the accepted offer with the user and the merchant (e.g., using a merchant identifier), as shown in step 1706. At step 1708, the account management system associates one of a possible set of varying restrictions using different restriction characteristics to user data, such as the user's account (e.g., from none to escrowed cash). At step 1710, the account management system tracks and records usage of accepted offers and applies restriction characteristics to the user's account data (e.g., issue payment from account to merchant, withdraw from annuity or retirement account to pay penalty) if the user does not meet the terms, conditions, and/or restrictions of the offer.

Figure 18:
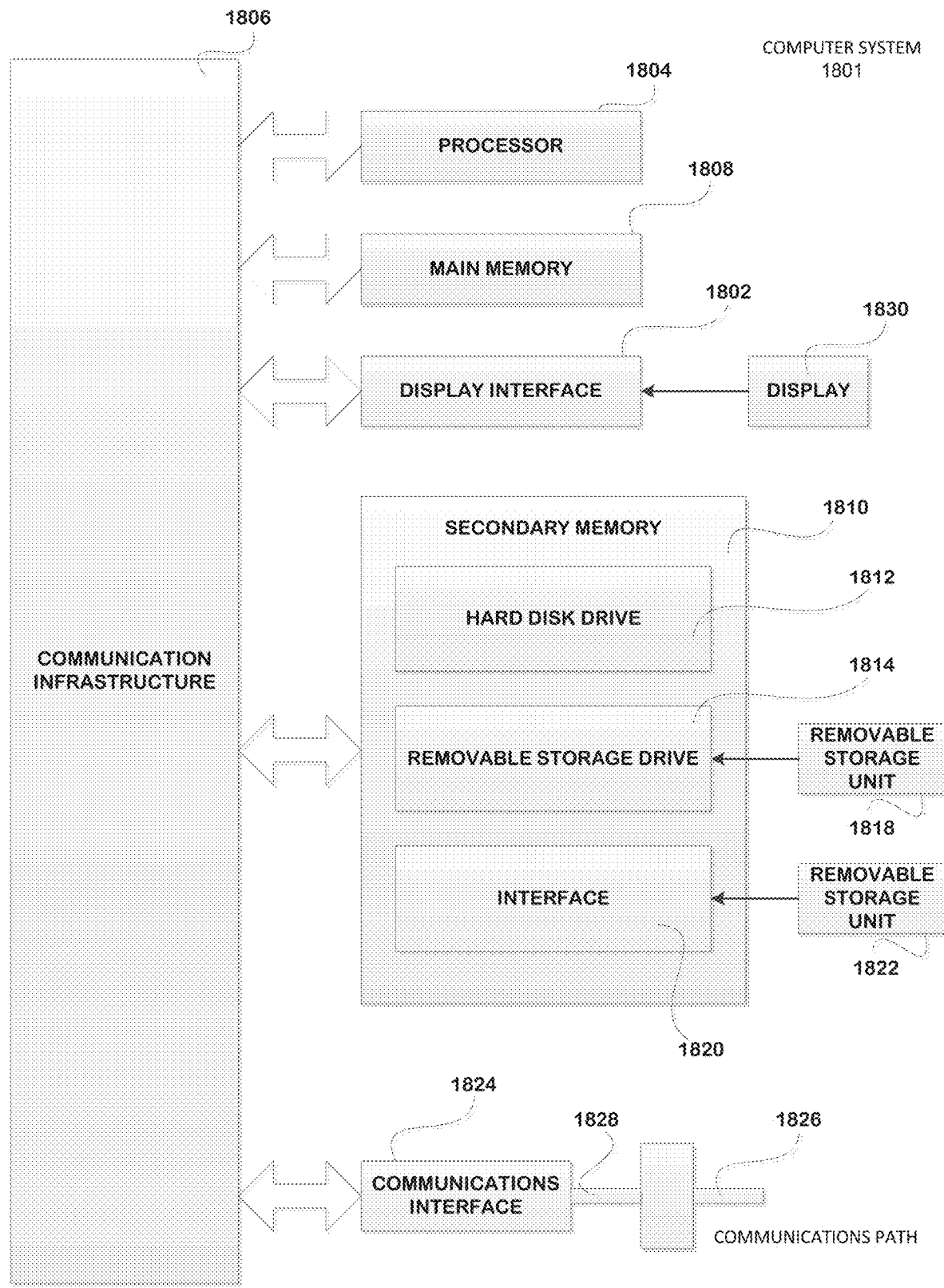
FIG. 18 is a block diagram of an illustrative computer system for implementing one or more embodiments of the systems of the present invention.

FIG. 18 is a block diagram of a computer system for implementing one or more of the systems of the present invention. FIG. 18 shows a computer system 1801 that includes one or more processors, such as processor 1804. The processor 1804 is connected to a communication infrastructure 1806 (e.g., a communications bus, cross-over bar, or network). Various software embodiments are described in terms of this exemplary computer system.

Computer system 1801 can include a display interface 1802 that forwards graphics, text, and other data from the communication infrastructure 1806 (or from a frame buffer not shown) for display on the display unit 1830. Computer system 1801 also includes a main memory 1808, preferably random access memory (RAM), and may also include a secondary memory 1810. The secondary memory 1810 may include, for example, a hard disk drive 1812 and/or a removable storage drive 1814, representing a floppy disk drive, a magnetic tape drive, an optical disk drive, etc. The removable storage drive 1814 reads from and/or writes to a removable storage unit 1818 in a well known manner. Removable storage unit 1818, represents a floppy disk, magnetic tape, optical disk, etc., which is read by and written to removable storage drive 1814. As will be appreciated, the removable storage unit 1818 includes a computer usable storage medium having stored therein computer software and/or data.

In alternative embodiments, secondary memory 1810 may include other similar devices for allowing computer programs or other instructions to be loaded into computer system 1801. Such devices may include, for example, a removable storage unit 1822 and an interface 1820. Examples of such may include a program cartridge and cartridge interface (such as that found in video game devices), a removable memory chip (such as an erasable programmable read only memory (EPROM), or programmable read only memory (PROM)) and associated socket, and other removable storage units 1822 and interfaces 1820, which allow software and data to be transferred from the removable storage unit 1822 to computer system 1801.

Computer system 1801 may also include a communications interface 1824. Communications interface 1824 allows software and data to be transferred between computer system 1801 and external devices. Examples of communications interface 1824 may include a modem, a network interface (such as an Ethernet card), a communications port, a Personal Computer Memory Card International Association (PCMCIA) slot and card, etc. Software and data transferred via communications interface 1824 are in the form of signals 1828, which may be electronic, electromagnetic, optical or other signals capable of being received by communications interface 1824. These signals 1828 are provided to communications interface 1824 via a communications path (e.g., channel) 1826. This path 1826 carries signals 1828 and may be implemented using wire or cable, fiber optics, a telephone line, a cellular link, a radio frequency (RF) link and/or other communications channels. These computer program products provide software to the computer system 1801.

Computer programs associated with the present invention (also referred to as computer control logic) may be stored in main memory 1808 and/or secondary memory 1810. Computer programs may also be received via communications interface 1824. Such computer programs, when executed, enable the computer system 1801 to perform the features of the present invention, as discussed herein. In particular, the computer programs, when executed, enable the processor 1804 to perform the features of the present invention. Accordingly, such computer programs represent controllers of the computer system 1801.

In embodiments in which the invention is implemented using software, the software may be stored in a computer program product and loaded into computer system 1801 using removable storage drive 1814, hard drive 1812, or communications interface 1824. The control logic (software), when executed by the processor 1804, causes the processor 1804 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s). In yet another embodiment, the invention is implemented using a combination of both hardware and software. It is understood that the exemplary environment illustrated in FIG. 18 is not intended to limit the present disclosure and that other alternative hardware and/or software environments may be used without departing from the scope of this disclosure.

One or more features illustratively described herein can be implemented individually or in various combinations. The present system, method, or related inventions also relate to a non-transient computer-readable medium configured to carry out any one of the methods disclosed herein or variations thereof. A software application(s) for carrying out the methods can be a set of instructions readable by a processor and stored on the non-transient computer-readable medium. Such medium may be permanent or semi-permanent memory, such as hard drive, floppy drive, optical disk, flash memory, ROM, EPROM, EEPROM, etc., as would be known to those of ordinary skill in the art.

As a matter of clarification, in some transaction processing networks, requested transactions are transmitted from a point of sale system to network that processes the payment such by a payment processing provider and the network interacts with the account management system such as to approve the transaction and receive transaction related data.

The processes, steps, or methods illustratively described herein can be implemented using the described examples of hardware and network configurations.

It is understood that activity described from a user's perspective also encompasses the related features that are implemented on the system, platform, software, or process as part of providing that activity, operation, or interaction. The terms "adapted" or "configured" "implemented" indicate that software, hardware (including computer-readable), or combinations thereof are implemented by way of computer programs or circuitry to implement a particular structure or specialized computer system.

Transmission and reception of data or information can be between computers, databases, storage devices, or internal computer equipment and be carried by transmitting electrical signals (e.g., carrying packets or messages) using computer equipment and are also carried by generating signals in response (e.g., consistent with the steps or processes described herein). A computer or computer system can be one or more computers. A network can also involve multiple networks.

The terms and expressions which have been employed in the specification are used as terms of description and not of limitations. There is no intention in the use of such terms and expressions to exclude any equivalents of the features shown and described or portions thereof, but it is recognized that various modifications are possible within the scope of the claims to the invention.

It should be understood that the use of the terms "may," "can," or "is" (and variations) indicate that this is one way implementation but others may exist.

The present systems, methods, and computer readable medium provide new tools that assist consumers and merchants in achieving advantages that are were not previously available from existing systems.

The features and steps described herein may be implemented and performed in different combinations or in different sequences as appropriate. Depending on the context, steps can be removed from a sequence. The features and steps may also be combined with other equipment, processes, steps, or systems illustratively described herein. Each and every one of these permutations and combinations is separately deemed to be an embodiment herein in its own right. It is therefore intended that all of these embodiments, examples, variations, and modifications thereon are meant to be encompassed within the spirit and scope of the present invention as set forth in the following claims.

It should be appreciated that the embodiments described herein are only illustrative. One of ordinary skill in the art will appreciate that various modifications, additions and alterations may be made to the invention without departing from the spirit and scope of the invention as defined in the appended claims.

What is claimed is:

1. A system for controlling computer transactions over dispersed network elements, the system comprising:

an account management computing system comprising a first database that stores records of user accounts containing financial data of individual users, wherein the first database is structured to store electronic records for users, wherein the data records comprises user financial data and user personal data; the user financial data comprising an investment account, one or more values representing amounts of investments, and investment characteristics comprising an interest rate, a length of time that an invested amount must remain in the user account, and penalties for withdrawal of an amount prior to an end of that time period, and the user personal data comprises personal identifying information provided by the user, personal identifiers generated by the system that uniquely identify a user from all other users, user profile information stored in the record with the user financial data to specify personal characteristics and demographics of the user including at least a first financial value and a budget type, where the first financial value represents an amount of money the user intends to spend on a particular category of products or services and the budget type identifies an actual category of products or services; other data stored in the record includes a predetermined time frame that the user intends to spend the identified amount of money on such products or services, the user financial data comprises an account identifier, and wherein interrelated financial data and the personal data are associated with a specific user;

wherein the account management computing system is configured to create pools of users by implementing a sorting system configured to select one or more particular values as identifying criterion and perform sorting and filtering of user financial and personal data stored in the first database to form a plurality of custom anonymous pools wherein each pool of sorted data is an aggregate pool of data relating to a sub-portion of users, wherein the aggregate pool of data specifies a quantity of users possessing the one or more particular values selected as the identifying criterion for the personal data and wherein the account management computing system is configured to eliminate all personal identifying data from the formed pools;

wherein the account management computing system is configured to receive a discount offer from a first merchant to the users in the selected pool, the discount offer comprising a discount percentage value and a predetermined time period during which the discount percentage value is valid for transactions with the first merchant; and wherein the account management computing system is configured to, in response to receiving a user selection of the discount offer, receive transaction data from point of sale devices or websites of the first merchant and, during the predetermined time period, calculate a discounted amount based on a purchase amount and the discount percentage value of the selected discount offer for that product or service that is subject to the discount offer, and, at the time of processing transactions determined to include selected discount offers, automatically deduct the discounted amount from the user account that processes transactions for users in their account including discounts as part of selected offers, whereby the discount offer is automatically applied to the user accounts.

2. The system of claim 1, wherein the interrelated financial data and the personal data are stored in the same database record.

3. The system of claim 1, wherein the account management computing system is further configured to:
   determine and store electronic records of one or more individual financial accounts for a plurality of users that have financial accounts managed by the account management computing system;
   calculate a current investment value for each of the one or more financial accounts by applying investment characteristics that vary an asset value of the financial account over time;
   create purchase card accounts associated with the financial accounts and issues a physical credit or debit card for a purchase card account to the users; and
   manage account transactions against the purchase card accounts using the associated financial accounts.

4. The system of claim 3, further comprising a rewards computing system, coupled to the account management computing system, that generates and manages rewards generated from the account transactions executed using the credit or debit card with the first merchant during the predetermined time period, wherein the rewards are stored for the each purchase card account in addition to a monetary value of the each purchase card account.

5. The system of claim 4, wherein the account management computing system is further configured to specify the current investment value as a function of a value of the financial accounts.

6. The system of claim 1, further comprising:
   a merchant interface computing system, coupled to the account management computing system, that is configured to:
     generate interactive options that provide individual merchants an opportunity to enter a discount offer message based upon data characteristics received from a remote computing device of an individual merchant, the data characteristics comprising the discount percentage value and the predetermined time period during which the discount percentage value is valid for transactions with the individual merchant using the debit or credit card select one or more of the formed pools; and
     issue a message that includes the discount offer to the selected pool; and
   wherein the data characteristics received from the remote computing device of the individual merchant further comprise a particular product, a particular brand, or a type of products, wherein the discount percentage value is only valid for transactions associated with the particular product, the particular brand, or the type of products.

7. The system of claim 6, wherein the merchant interface computing system further provides the first merchant the opportunity to selectively transmit discount offers to users in response to one or more of the data characteristics of the user.

8. The system of claim 7, wherein the account management computing system is further configured to:
   determine and store electronic records of one or more individual financial accounts for a plurality of users that have financial accounts managed by the account management computing system;

calculate a current investment value for each of the one or more financial accounts by applying investment characteristics that vary an asset value of the financial account over time;

create purchase card accounts associated with the financial accounts and issues a physical credit or debit card for a purchase card account to the users; and manage account transactions against the purchase card accounts using the associated financial accounts.

9. The system of claim 7, wherein the account management computing system is further configured to specify the current investment value as a function of a value of the financial accounts.

10. The system of claim 8, further comprising a user interface system configured to permit the users to select and accept one or more of the discount offers, and in response, the account management computing system attaches a restriction characteristic to the financial data of the corresponding user in the account management computing system, the restriction characteristic based on the first financial value of that user; and wherein the account management computing system is further configured to:
monitor transactions of the individual users with the first merchant on the credit or debit card during the predetermined time period;
determine whether the restriction characteristic has been satisfied by determining that the transactions executed using the credit or debit card during the predetermined time period did not total the first financial value, and
in response to the determination, execute an action that charges an amount to the financial accounts of the corresponding user if the restriction characteristic has not been satisfied and sends an electronic message to the corresponding merchant.

11. The system of claim 8, wherein the account management computing system is further configured to analyze the account transactions executed using the credit or debit card during the predetermined time period to identify a merchant identifier associated with the account transactions and applies the discount percentage value to the account transactions when the merchant identifier is associated with the first merchant.

12. The system of claim 10, wherein the account management computing system is further configured to analyze the account transactions executed using the card during the predetermined time period to identify a merchant identifier associated with the account transactions and applies the discount percentage value to the account transactions when the merchant identifier is associated with the first merchant.

13. The system of claim 10, wherein the account management computing system is further configured to track a usage of accepted discount offers and, in response, automatically removes the restriction characteristic from the purchase card account when the account transactions executed using the credit or debit card with the first merchant during the predetermined time period have satisfied the restriction characteristic.

14. The system of claim 10, wherein executing the action that charges the amount to the financial accounts of the corresponding user comprises transmitting a payment of the amount to the corresponding merchant.

15. The system of claim 10, wherein the action that charges the amount to the financial accounts of the corresponding user comprises compensating the first merchant for unrealized profits.

* * * * *